United States Patent
Smith

(10) Patent No.: US 9,563,797 B2
(45) Date of Patent: *Feb. 7, 2017

(54) SYSTEM AND METHOD FOR TRANSMITTING INFORMATION BETWEEN MULTIPLE OBJECTS MOVING AT HIGH RATES OF SPEED

(71) Applicant: Adaptive Controls Holdings LLC, Columbus, OH (US)

(72) Inventor: Ryan Smith, Columbus, OH (US)

(73) Assignee: ADAPTIVE CONTROLS HOLDINGS LLC, Columbus ( * ) Notice: Subject to any disclaimer, the term of this patent is extended or adjusted under 35 U.S.C. 154(b) by 0 days.

This patent is subject to a terminal disclaimer.

(21) Appl. No.: 14/754,149

(22) Filed: Jun. 29, 2015

(65) Prior Publication Data

US 2016/0012266 A1 Jan. 14, 2016

Related U.S. Application Data

(63) Continuation of application No. 13/775,993, filed on Feb. 25, 2013, now Pat. No. 9,070,064.

(60) Provisional application No. 61/603,032, filed on Feb. 24, 2012.

(51) Int. Cl.
*H04Q 5/22* (2006.01)
*G06K 7/10* (2006.01)
*G06K 19/07* (2006.01)
*G08G 1/095* (2006.01)

(52) U.S. Cl.
CPC ....... *G06K 7/10425* (2013.01); *G06K 19/0723* (2013.01); *G08G 1/095* (2013.01); *Y10T 29/49826* (2015.01)

(58) Field of Classification Search
CPC .. G01D 5/2086; G06K 19/0723; G08G 1/095; Y10T 29/49826
USPC ........ 340/10.1, 568.1, 572.1–572.9, 6.1, 8.1, 340/5.1, 10.3, 901, 905, 10.41, 501, 505, 340/539.1, 693, 573.3, 531
See application file for complete search history.

(56) References Cited

U.S. PATENT DOCUMENTS

| | | | |
|---|---|---|---|
| 5,196,846 A | 3/1993 | Brockelsby | |
| 5,289,183 A | 2/1994 | Hassett | |
| 5,420,794 A | 5/1995 | James | |
| 6,112,152 A | 8/2000 | Tuttle | |
| 6,163,277 A | 12/2000 | Gehlot | |
| 6,484,080 B2 | 11/2002 | Breed | |
| 6,587,755 B1 | 7/2003 | Smith | |
| 6,728,605 B2 | 4/2004 | Lash | |
| 7,034,741 B2 * | 4/2006 | Chon | G08G 1/0962 342/42 |
| 7,092,815 B2 | 8/2006 | Dort | |

(Continued)

*Primary Examiner* — Daniel Previl
(74) *Attorney, Agent, or Firm* — Standley Law Group LLP

(57) ABSTRACT

Provided herein is a system for transmitting data to an object travelling along a surface. The object preferably contains an antenna which produces a read range having a length (L) in the direction of travel and a width (W) substantially perpendicular to the direction of travel. A first plurality of RFID transponders may be positioned within a surface as a row which is substantially perpendicular to the direction of travel. A second plurality of RFID transponders may be positioned following the first row. Depending on the speed of the object travelling the surface at this location, more rows of transponders may be used. A method for placing the RFID transponders within the surface is also disclosed.

20 Claims, 28 Drawing Sheets

(56) References Cited

U.S. PATENT DOCUMENTS

| | | | |
|---|---|---|---|
| 7,277,809 B1* | 10/2007 | DeWitt, Jr. | G01P 21/02 |
| | | | 340/901 |
| 7,296,646 B2 | 11/2007 | Kawazoe | |
| 9,070,064 B2* | 6/2015 | Smith | G06K 19/0723 |
| 2005/0137783 A1* | 6/2005 | Dort | G08G 1/096725 |
| | | | 701/119 |
| 2006/0012476 A1* | 1/2006 | Markhovsky | G01S 13/74 |
| | | | 340/539.32 |
| 2006/0180647 A1 | 8/2006 | Hansen | |
| 2007/0233351 A1* | 10/2007 | Wang | B60T 7/122 |
| | | | 701/70 |
| 2007/0257112 A1 | 11/2007 | Fujii | |
| 2009/0033316 A1* | 2/2009 | Hosek | G01D 5/2086 |
| | | | 324/207.18 |
| 2009/0160604 A1 | 6/2009 | Nguyen | |
| 2010/0295773 A1* | 11/2010 | Alameh | H03K 17/9631 |
| | | | 345/156 |
| 2012/0019363 A1 | 1/2012 | Fein | |

\* cited by examiner

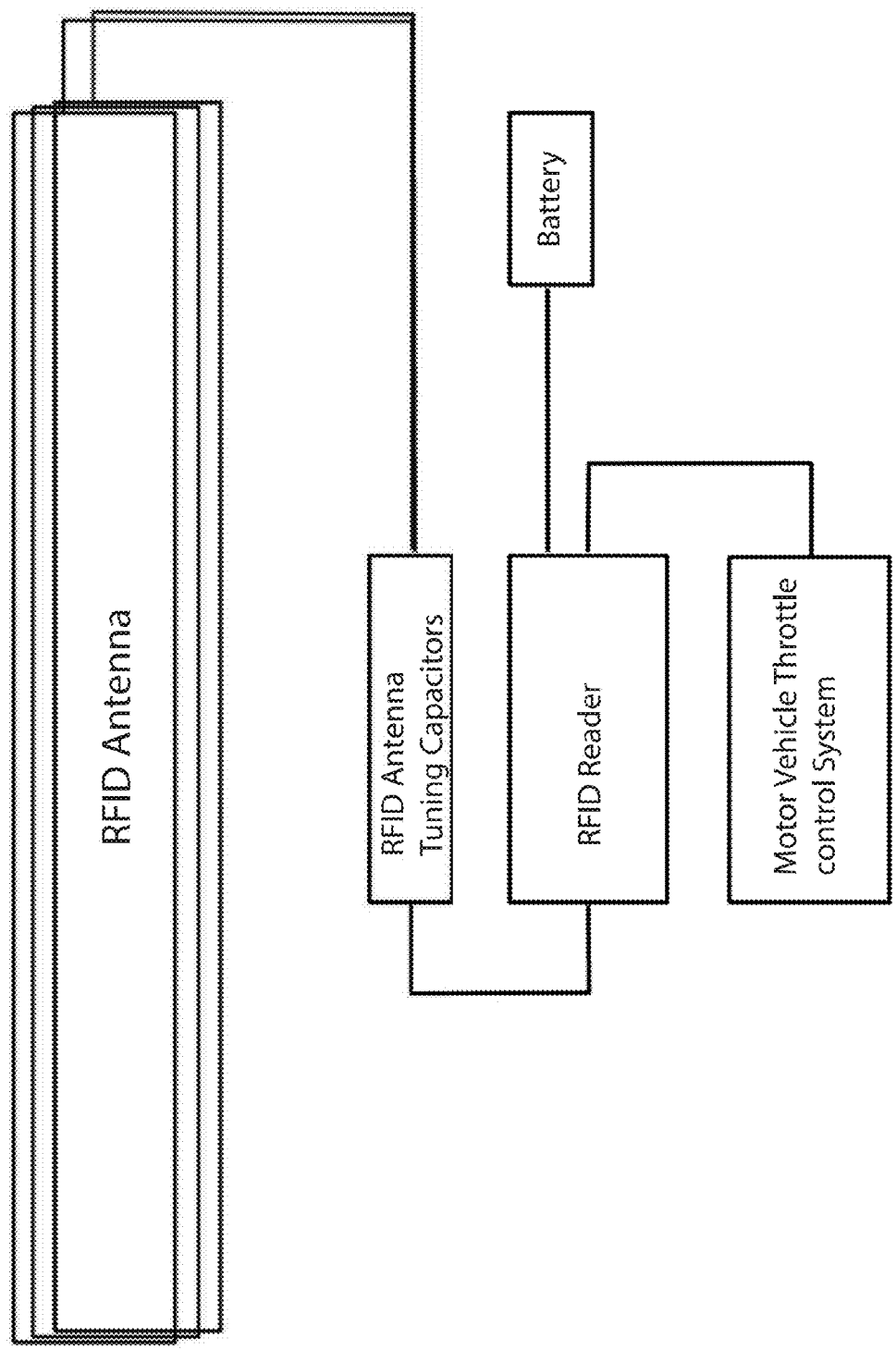

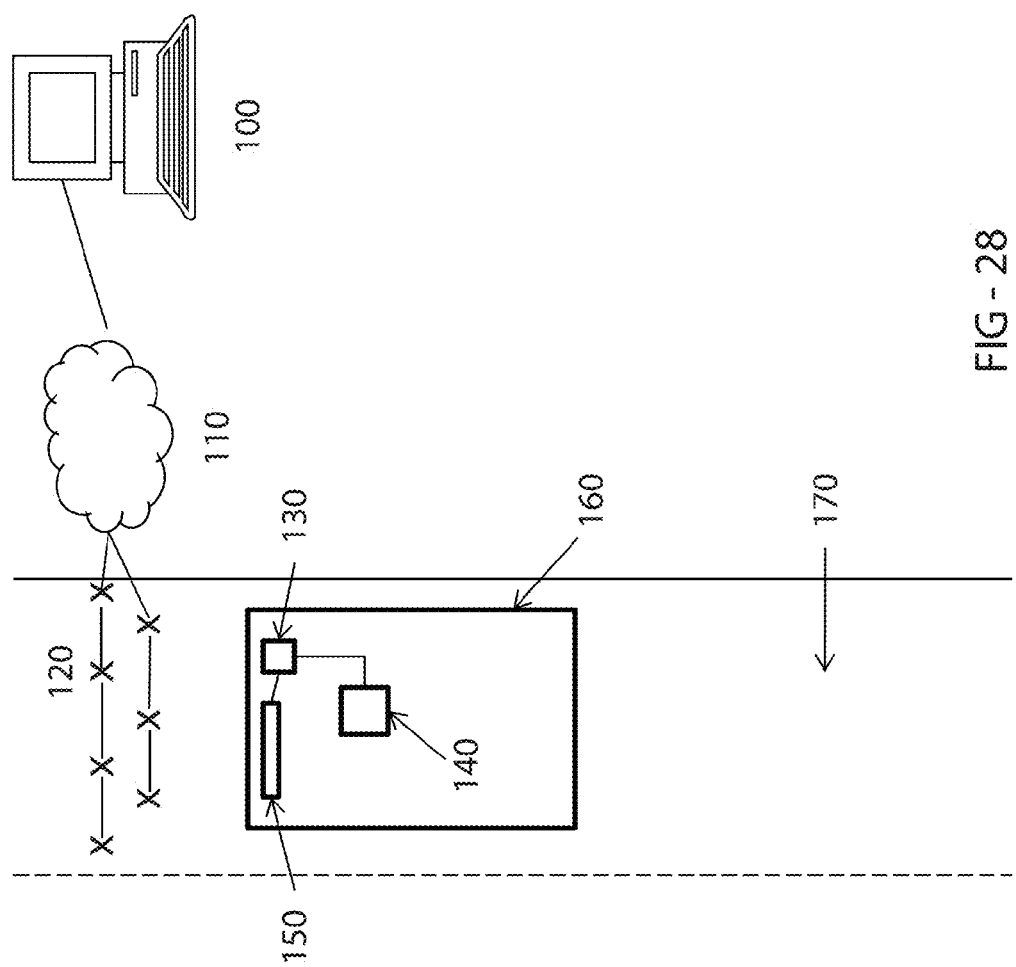

SYSTEM AND METHOD FOR TRANSMITTING INFORMATION BETWEEN MULTIPLE OBJECTS MOVING AT HIGH RATES OF SPEED

CROSS-REFERENCE TO RELATED APPLICATIONS

This application is a continuation of application Ser. No. 13/775,993 filed on Feb. 25, 2013 and now issued U.S. Pat. No. 9,070,064, which is herein incorporated by reference in its entirety. Application Ser. No. 13/775,993 is a Non-provisional of U.S. Application No. 61/603,032 filed on Feb. 24, 2012 which is also herein incorporated by reference in its entirety.

TECHNICAL FIELD

Exemplary embodiments generally relate to the use of Radio Frequency Identification (RFID) as a means for transmitting information between multiple objects moving past each other at high rates of speed.

BACKGROUND OF THE ART

The dangers of operating a motor vehicle at high speeds have been well documented by the high number of accidents causing both injuries and fatalities by operators, passengers, and sometimes even bystanders. Often times, the severity of the accident can be substantially reduced if the speed of the vehicles can be adequately controlled. It is now desirable to create an Adaptive Motor Vehicle Governing (AMVG) System to improve the safety of roadways. The AMVG System may be used to regulate the speed of motor vehicles to ensure compliance with established speed limits. Direct control, easy installation and manageable maintenance make the AMVG System an extremely viable solution to the growing problem of speed related accidents. Other embodiments of the AMVG System allow the transmission of other types of information to a motor vehicle moving at a high rate of speed.

The use of RFID as an enabling technology effectively addresses the issue of direct control. RFID is an automatic identification method and relies on storing and remotely retrieving data using a device called an RFID tag or transponder, which is a small object that can be attached to, or incorporated into, an object. RFID transponders contain silicon chips and antennas that enable them to receive and respond to radio-frequency queries from an RFID reader. Identification is performed almost instantly (within milliseconds). Additionally, identification does not require contact or a direct line of sight. Similarly, passive RFID transponders require no internal power source and run off of induction, whereas active RFID transponders require a power source. The RFID transponders store unique information and serve as a portable data carrier.

Generally, the process begins when a passive battery-less RFID transponder is charged through induction from the RFID antenna's magnetic field. The RFID antenna is the part of the system that radiates the induced magnetic field energy to, and receives information from, the RFID transponder. A magnetic field is generated by the RFID reader's RFID antenna and charges a capacitor in the RFID transponder. The RFID reader cycles between creating a magnetic field to charge an RFID transponder through induction and listening for a radio signal back from the RFID transponder. This cycle is continuous and allows the RFID reader to communicate with RFID transponders placed within the RFID antenna's read range without being queued. Once the RFID transponder stops receiving power through induction and its capacitor is fully charged, it sends its programmed information to the RFID reader. This information is deciphered by the RFID reader and documented according to a specified application.

Others have proposed using road-side RFID transponders with RFID readers located in each vehicle. There are several problems with this implementation. There are three frequency ranges used for RFID; Ultra High Frequency (UHF), High Frequency (HF) and Low Frequency (LF). Radio signals are electromagnetic waves and have a magnetic component and an electric component. LF and HF systems use the magnetic field to transfer power by induction. This field has a well-defined zone, but the strength of the field falls off quickly. UHF systems use the electric field to transfer power by capacitive coupling. The strength of this field does not fall off as quickly, so potentially longer read distances are possible. Reflection means that the zone is less well defined. As a result, UHF has the potential for the largest read range but has the least potential to penetrate through materials. Conversely, LF has the potential for the smallest read range but has the greatest potential to penetrate through materials. HF falls in the middle of these two extremes. Thus, on a multi-lane highway, a road-side reader would have difficulty reaching vehicles in the middle or opposing lanes.

Further, the presence of metal can present a variety of interference issues with RFID systems. Obviously, the primary material used to construct vehicles is metal, and there is a large presence of this on public roadways. Water, in its various phases, can also pose transmission issues with UHF and HF RFID systems. Thus, signals can easily be disrupted during rain, snow, or hail as well.

These factors, combined with the high speed of travel along many roadways, present several unsolved issues for an RFID speed control system. The embodiments of the AMVG System described herein provide a number of new advantages. The embodiments herein provide a high powered RFID antenna attached to an object, to ensure accurate transmission of authenticated information to an RFID reader, without interference from other active RFID devices within close proximity, when an RFID reader/RFID antenna pass in close proximity of RFID transponder(s) at high rates of speed. In this exemplary embodiment LF RFID is preferred.

SUMMARY OF THE EXEMPLARY EMBODIMENTS

The Roadway Network should consist of RFID transponders called Roadway Network Transponders (RNTs) programmed with the speed limit of the corresponding roadway. These RNTs will be placed in the roadway in a manner that allows for accurate performance based on the requirements and limitations of RFID technology, enabling the AMVG System.

The In-car Device preferably consists of an RFID antenna, placed in electrical communication with an RFID reader and an electronic/computer controlled Motor Vehicle Throttle Control System (MVTCS). The RFID antenna is the device that creates the magnetic field required for the induction powered RNTs to transmit the encrypted coded information/data to the RFID reader, which occurs via radio waves. The RFID antenna is preferably positioned along the bottom perimeter of the motor vehicle to ensure proper read distance in relation to the RNTs. The RFID antenna is connected to the RFID reader, which initiates the transmission of information through the RFID antenna from the RNTs. The RFID reader is also the device that decodes the radio wave transmitted information/data coded on the RNTs. This information (i.e., the speed limit of the roadway) is then communicated to the computer controlled MVTCS, which is the device that ultimately controls/governs the motor vehicle's speed. Motor vehicle manufacturers change their production processes on a yearly basis. Vehicle features are added and improved and production methods are changed frequently. This will allow for a safety device such as the AMVG System to be implemented easily into existing manufacturing systems. A coordinated effort between each individual motor vehicle manufacturer and a qualified AMVG System design team will design all specific components required for each type/style of motor vehicle, procure all necessary materials, design all manufacturing requirements and execute implementation of the AMVG System in all motor vehicles sold to operate on U.S. public roadways.

The maintenance of the RNTs should be extremely manageable due to longevity, durability and encryption safety features. Pursuant to the original installation plan, a program may be in place to ensure timely installation of RNT replacements. All the required entities, assets, installation specifications and personnel may be established and will continually monitor the system's performance to complete all maintenance needs. RNTs may be damaged, speed limits will change and new roads will be built; therefore, a maintenance program that inspects the RNTs on a continual biennial basis is sufficient to address any ongoing construction and troubleshooting issues that may arise. Special inspection motor vehicles can be equipped with RNT software installation equipment and speed limit validation recording tools and will enable maintenance crews to efficiently maintain a safe and secure AMVG System operation. Other government vehicles, such as police vehicles, may also have the RNT performance tracking systems installed and may document locations of failed RNTs. This information can then be forwarded to local Departments of Transportation so maintenance can be efficiently completed. The encryption safety features will prevent any issues of public delinquency by allowing the RFID reader to authenticate the information received from the RNT.

The foregoing and other features and advantages will be apparent from the following more detailed description of the particular embodiments of the invention, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which:

FIG. 27 provides an electrical schematic of one embodiment for the motor vehicle components including the MVTCS.

FIG. 28 provides an electrical schematic of one embodiment for the Information Communication Network System.

DETAILED DESCRIPTION

Figure 1:
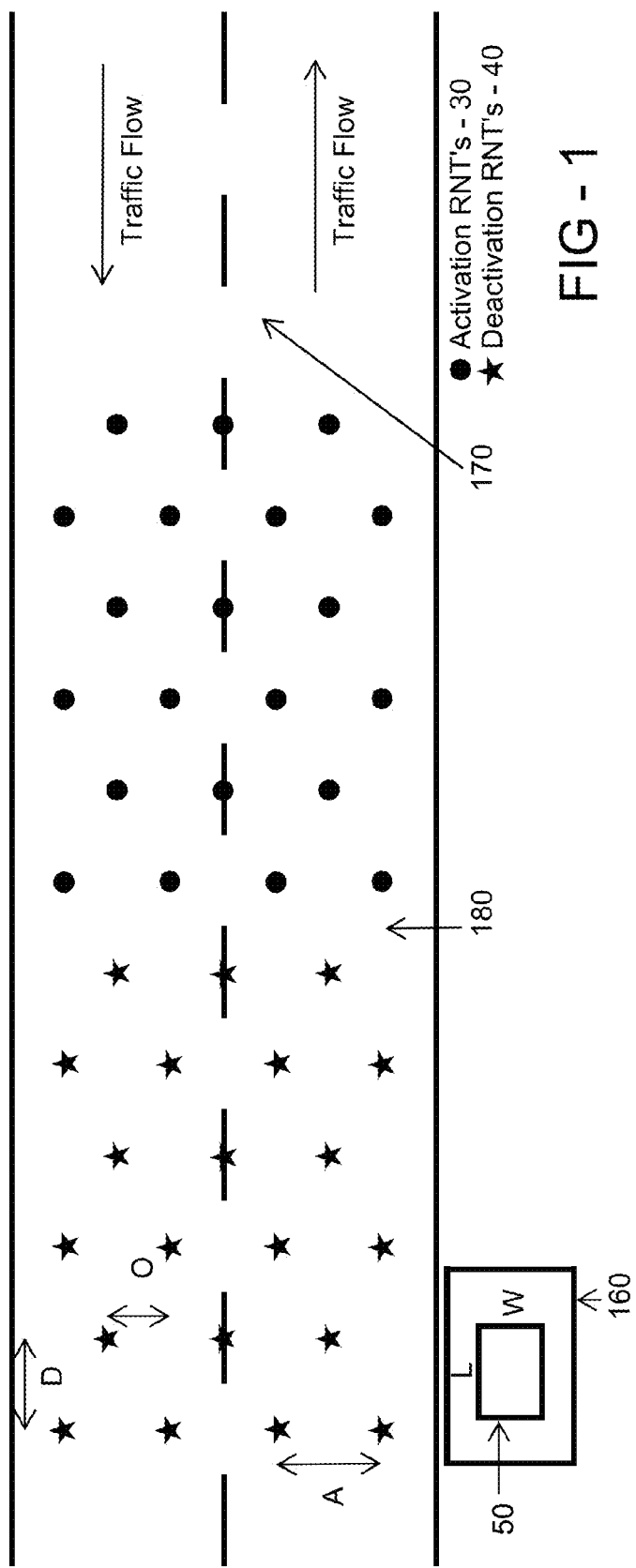
FIG. 1 provides a general schematic layout for Speed Limit Identification Zones (SLIZs) and an RFID antenna magnetic field.
Figure 2:
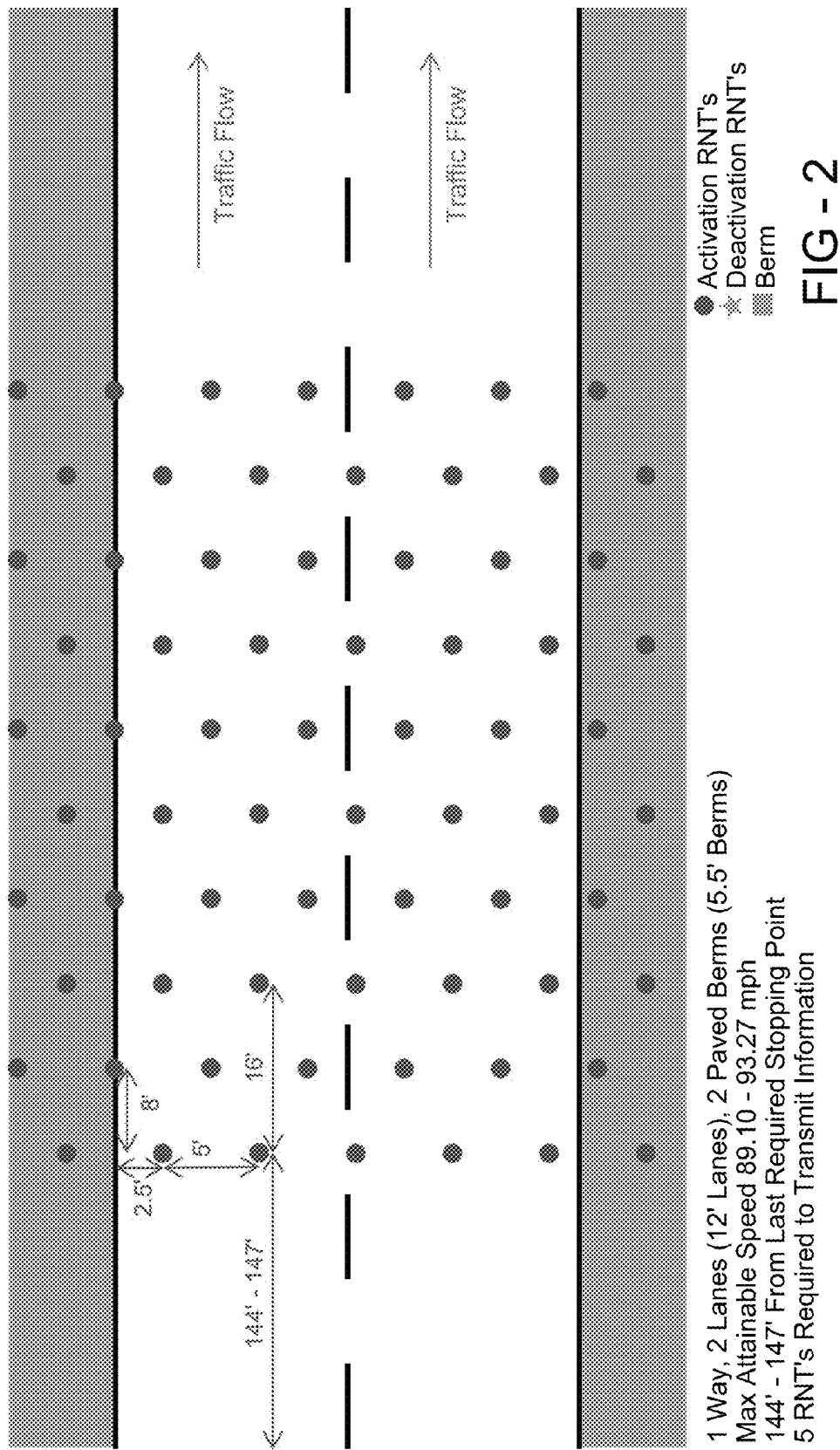
FIGS. 2-11 provide a schematic layout for several examples of the location of the Speed Limit Identification Zones (SLIZs).
Figure 3:
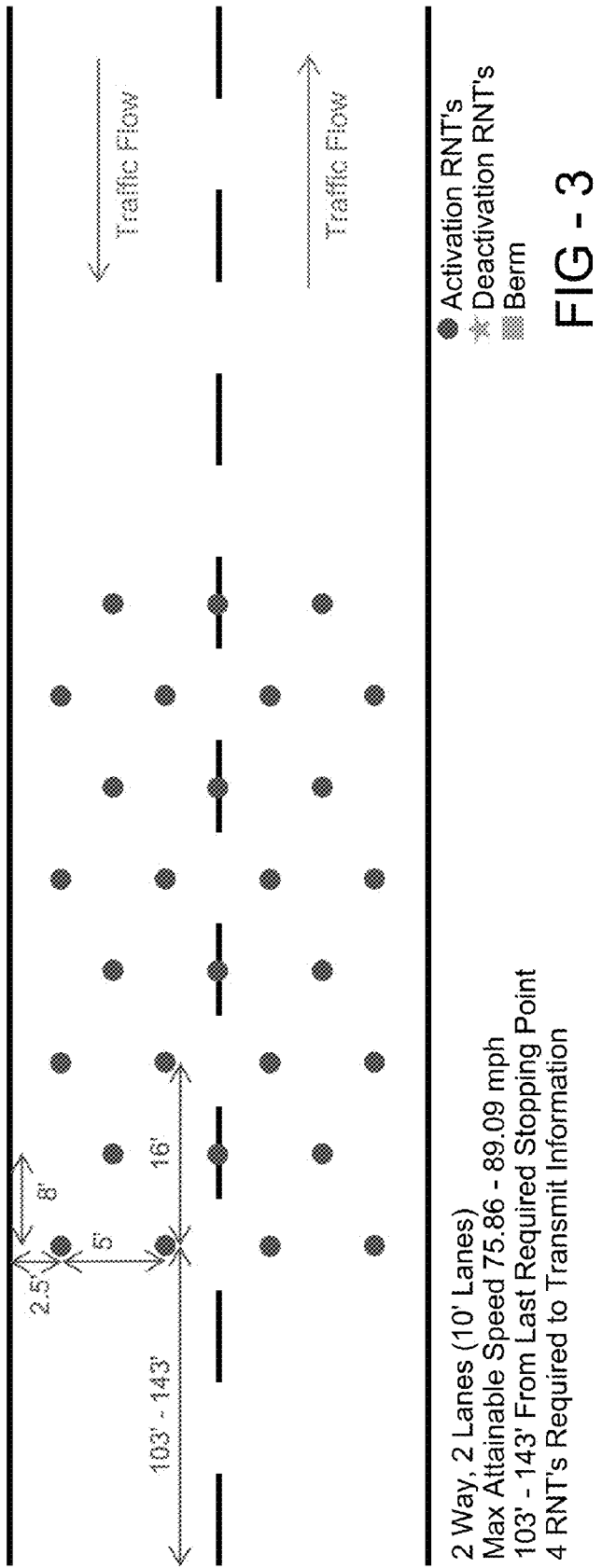
Figure 4:
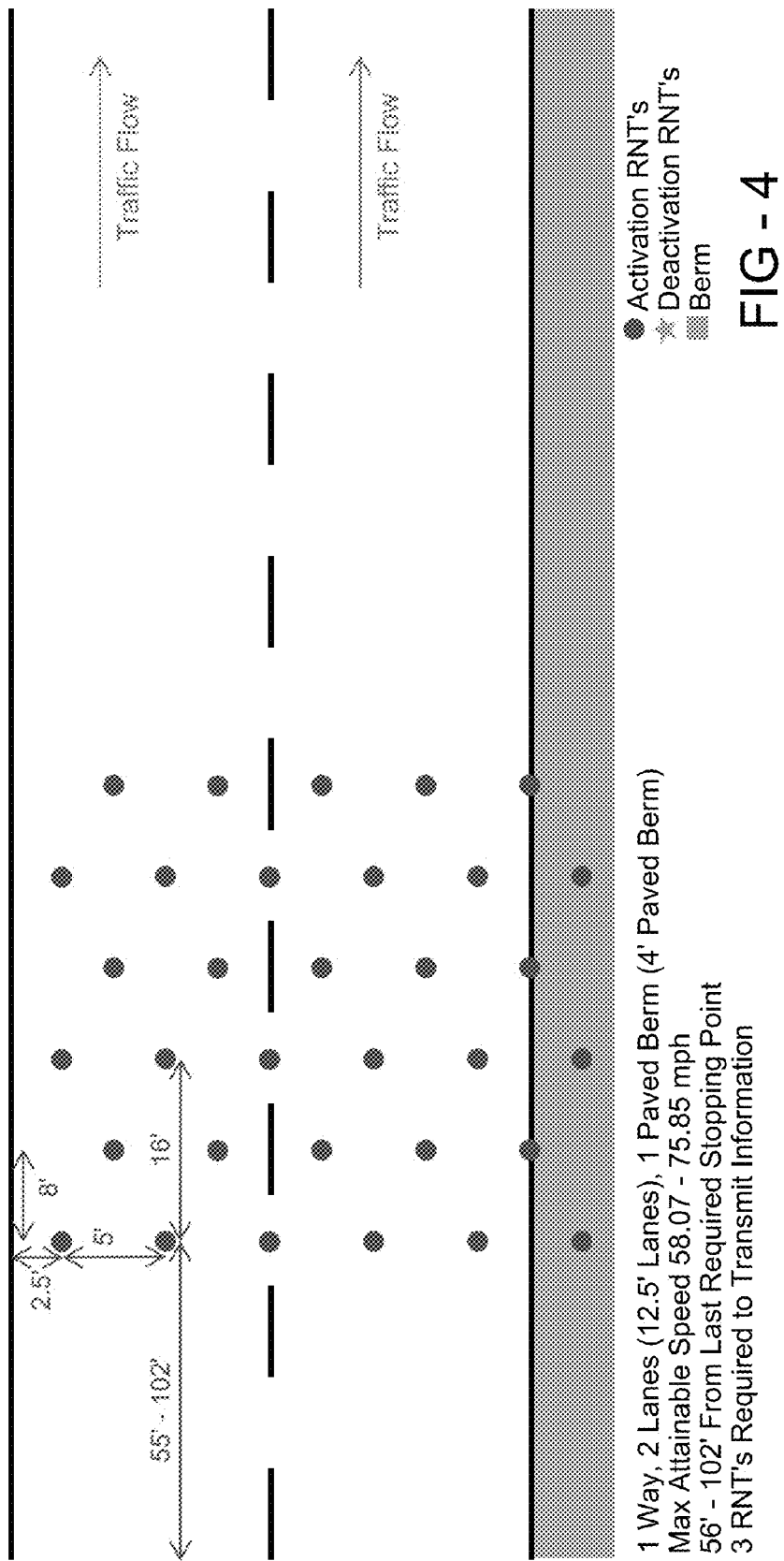
Figure 5:
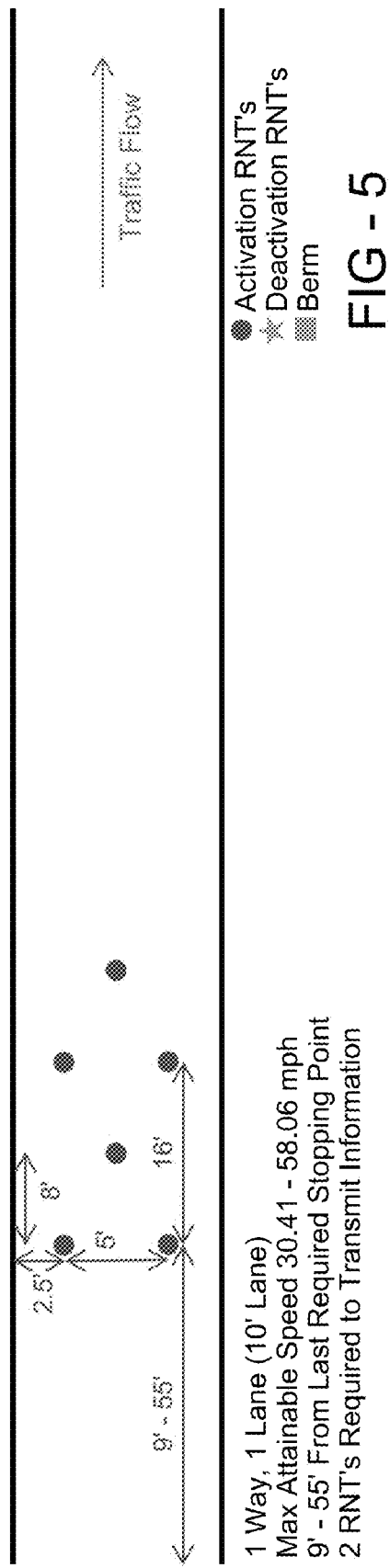
Figure 6:
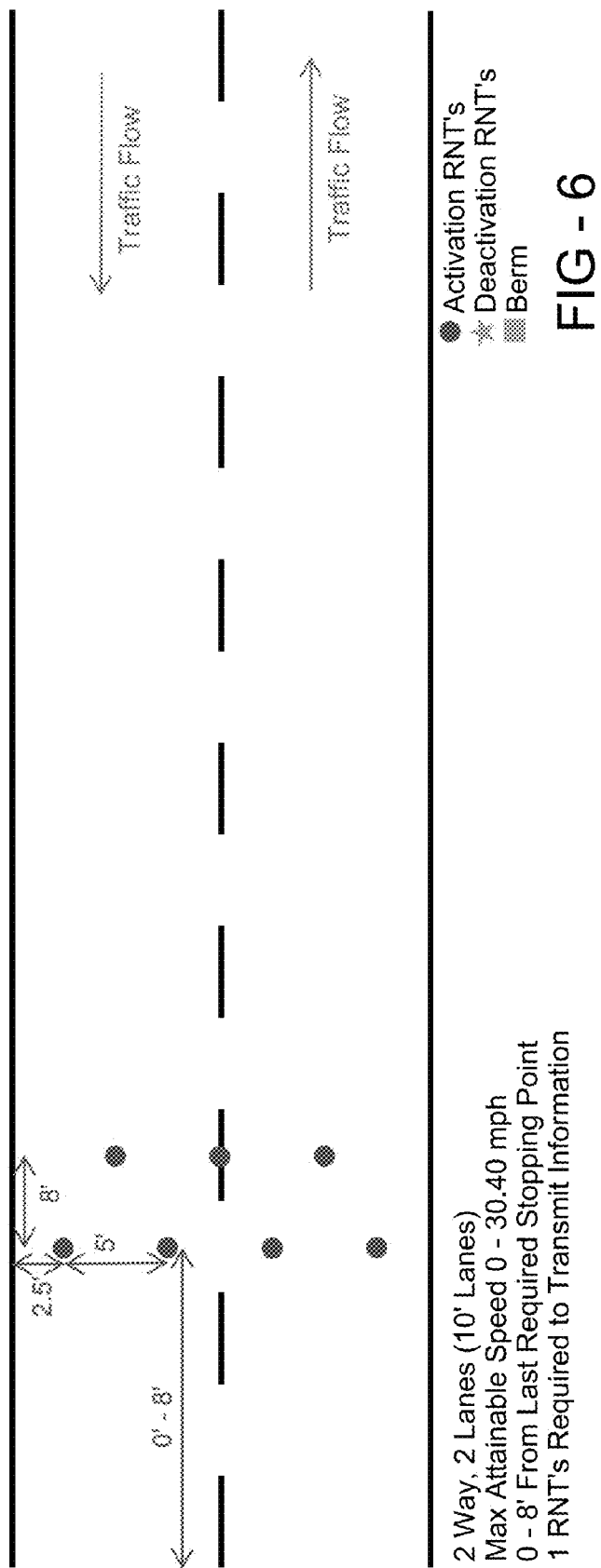
Figure 7:
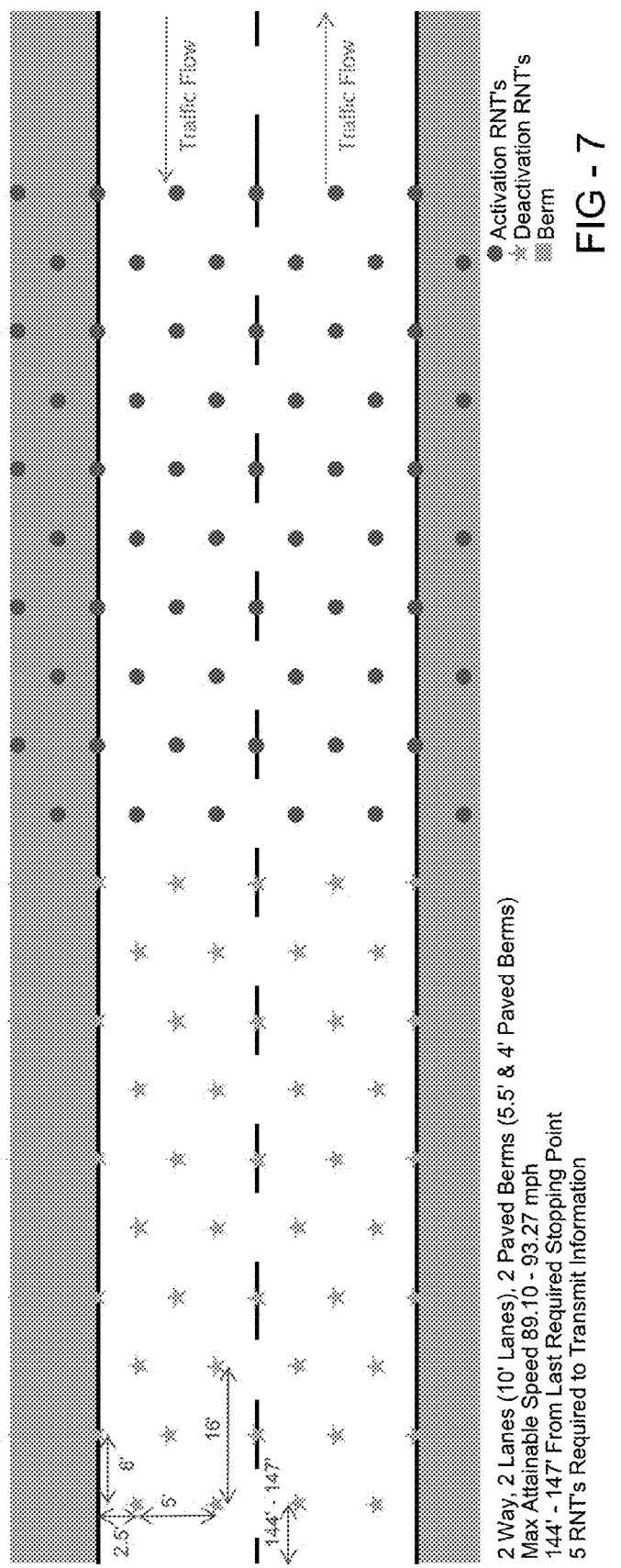
Figure 8:
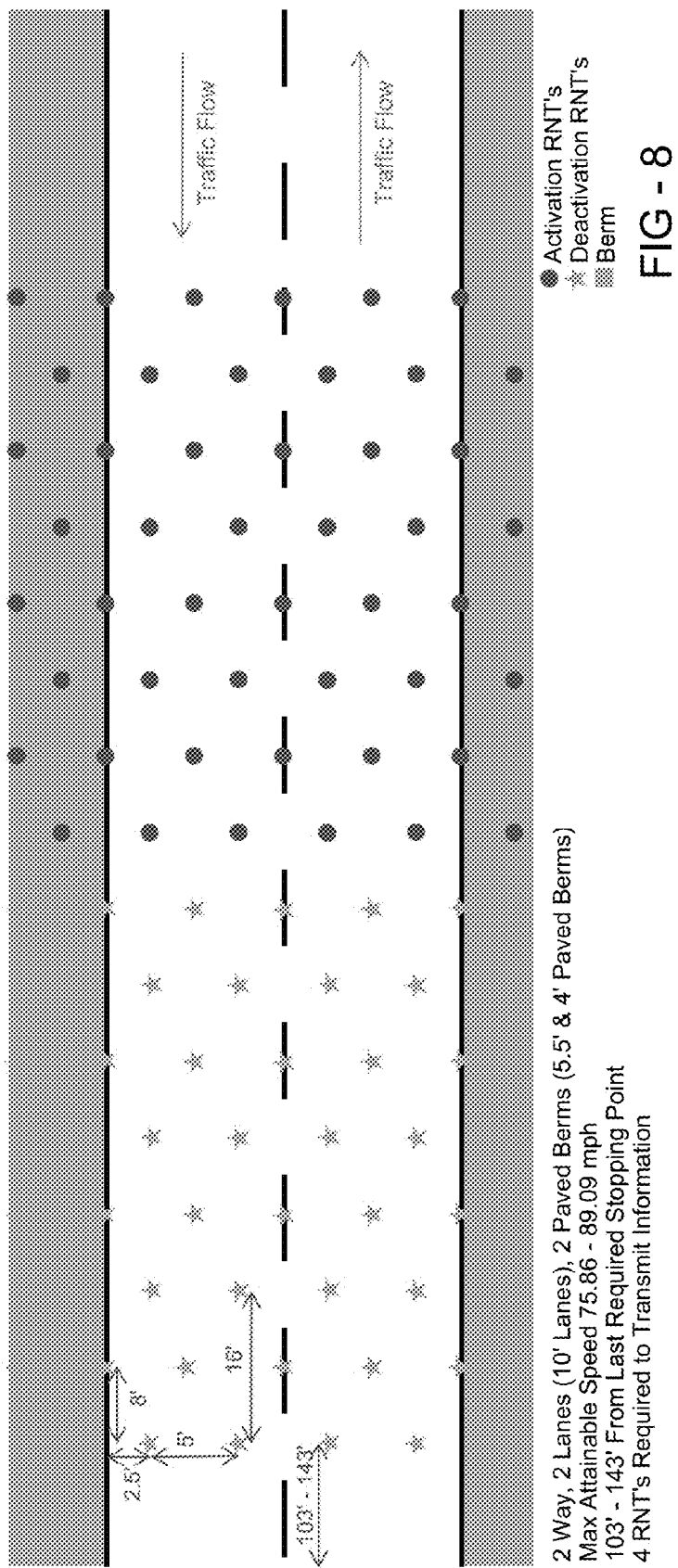
Figure 9:
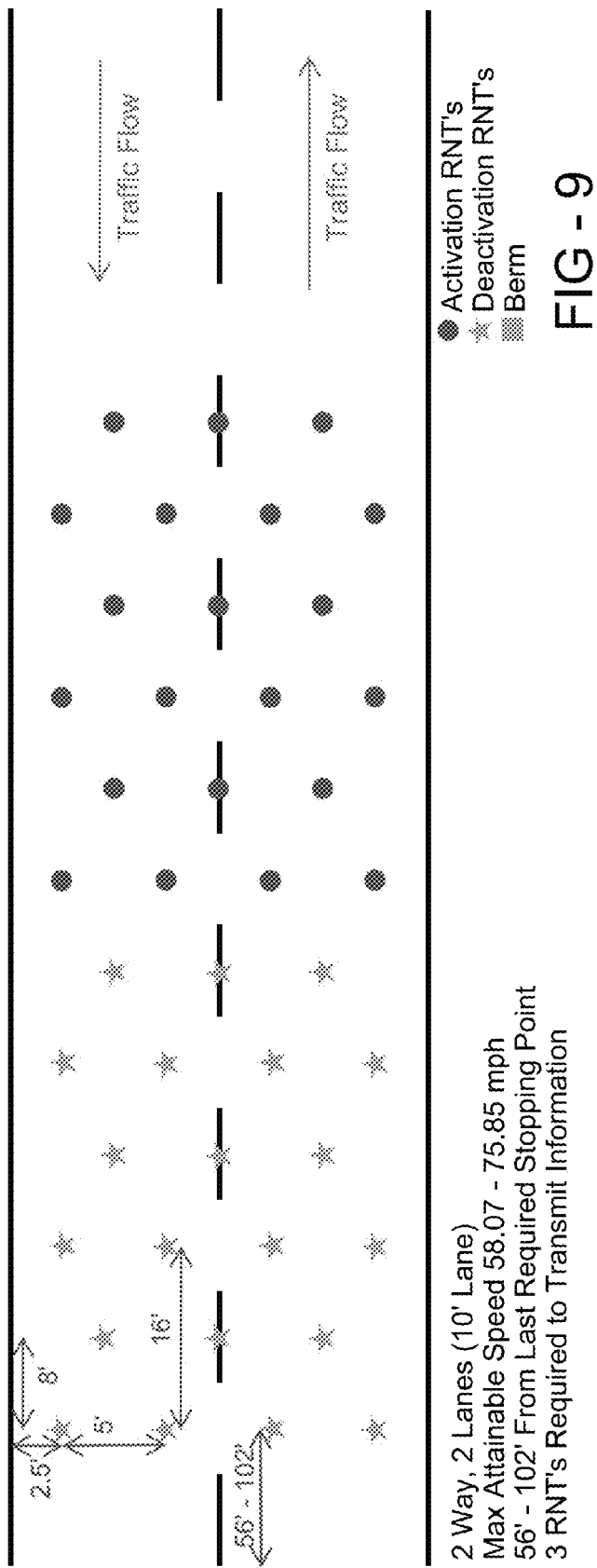
Figure 10:
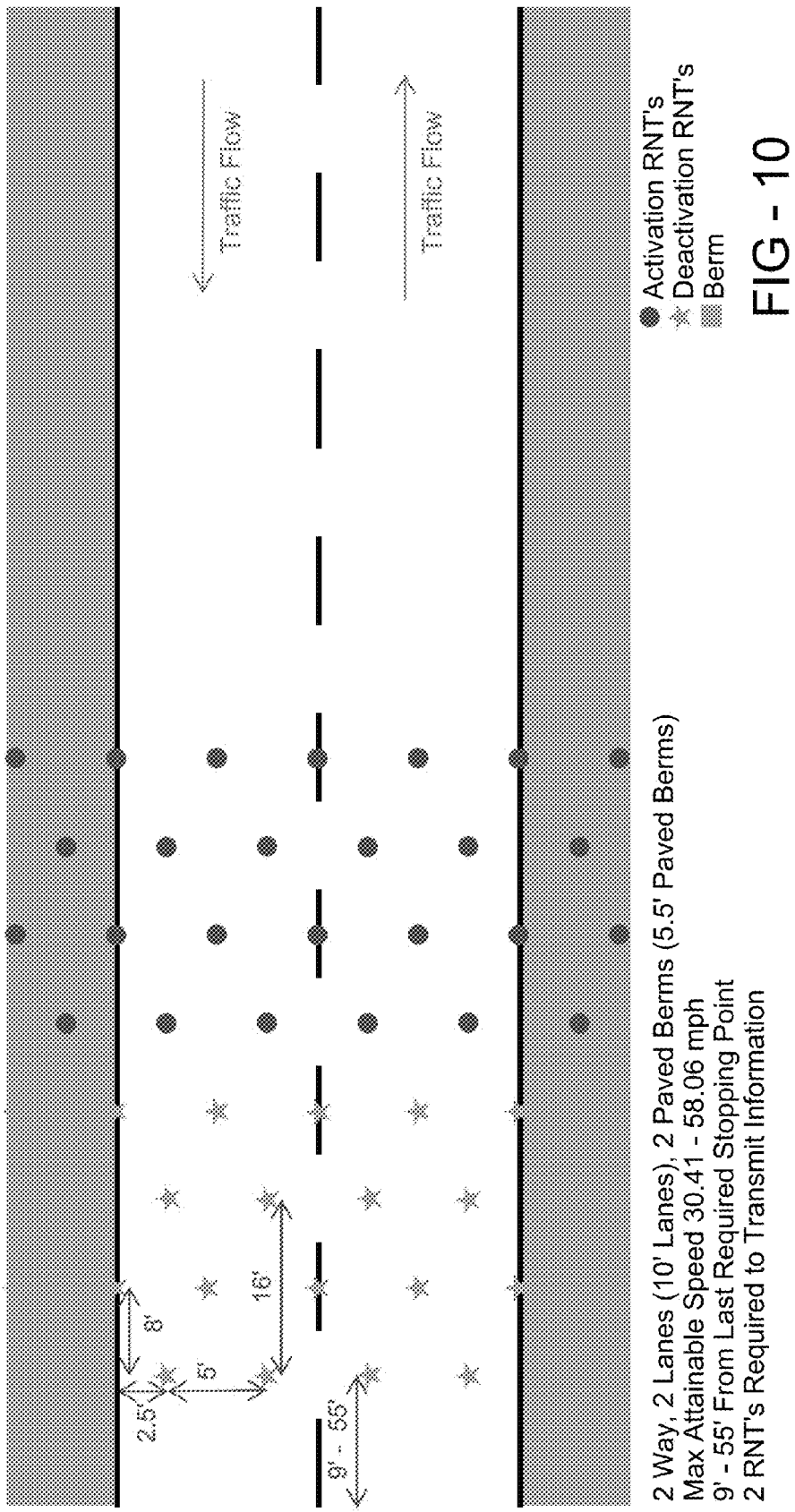
Figure 11:
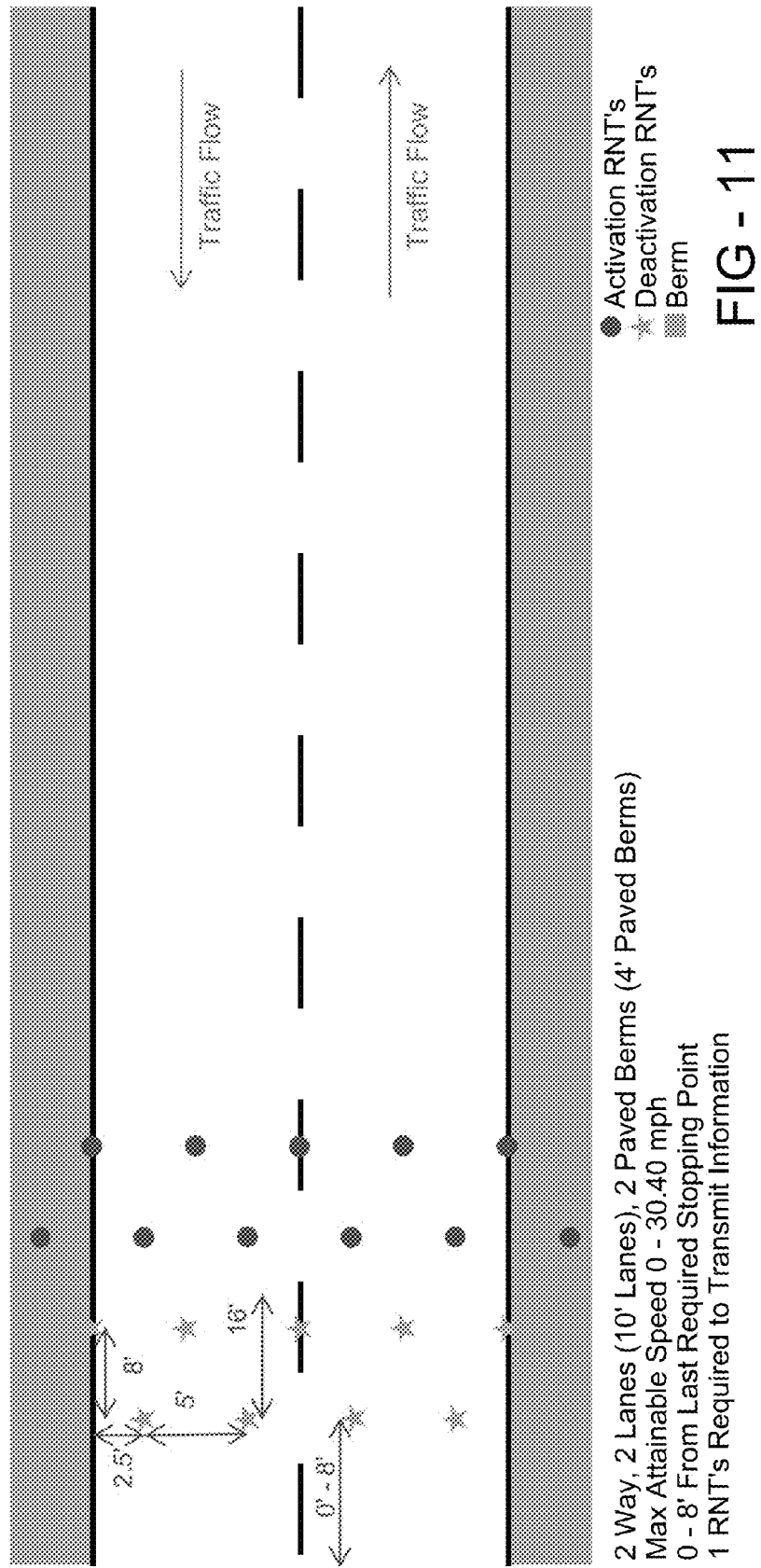
Figure 12:
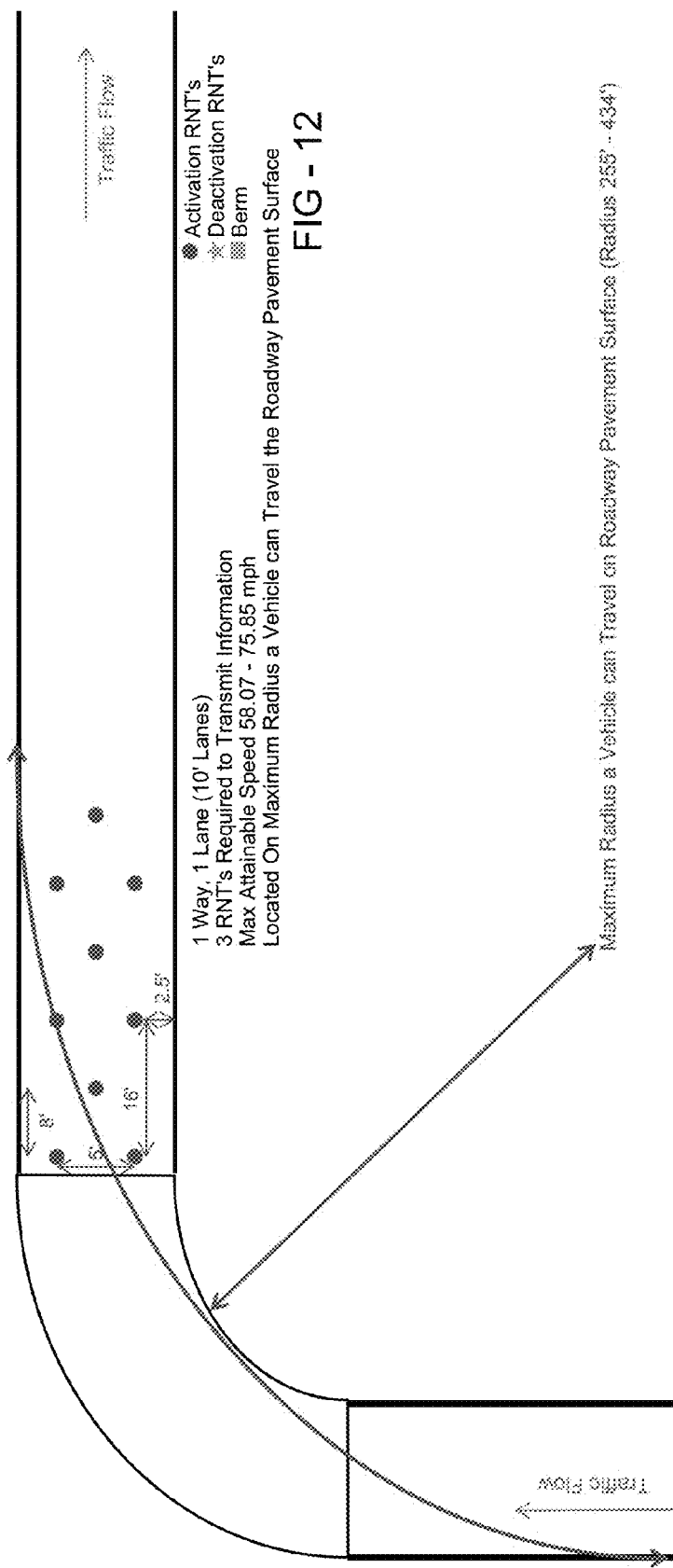
FIGS. 12-20 provide a schematic of several examples for the location of the SLIZs.
Figure 13:
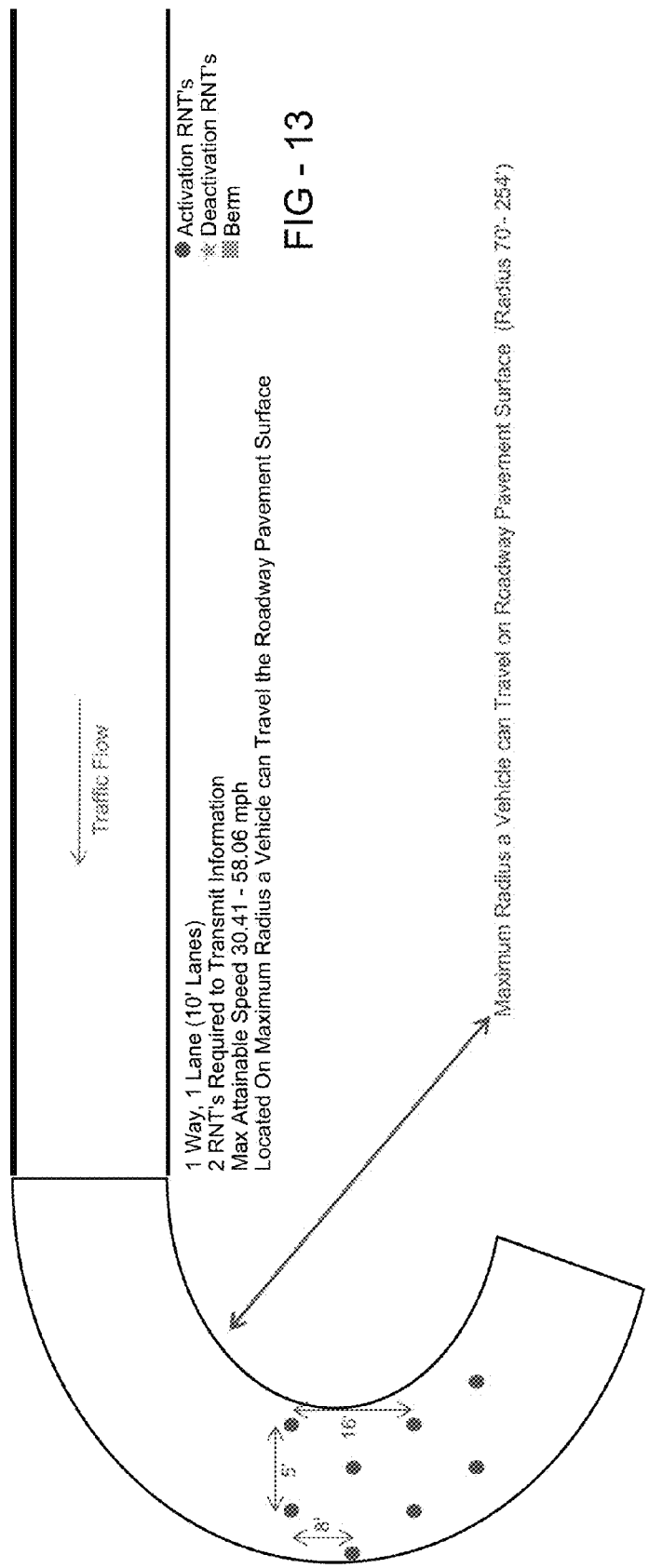
Figure 14:
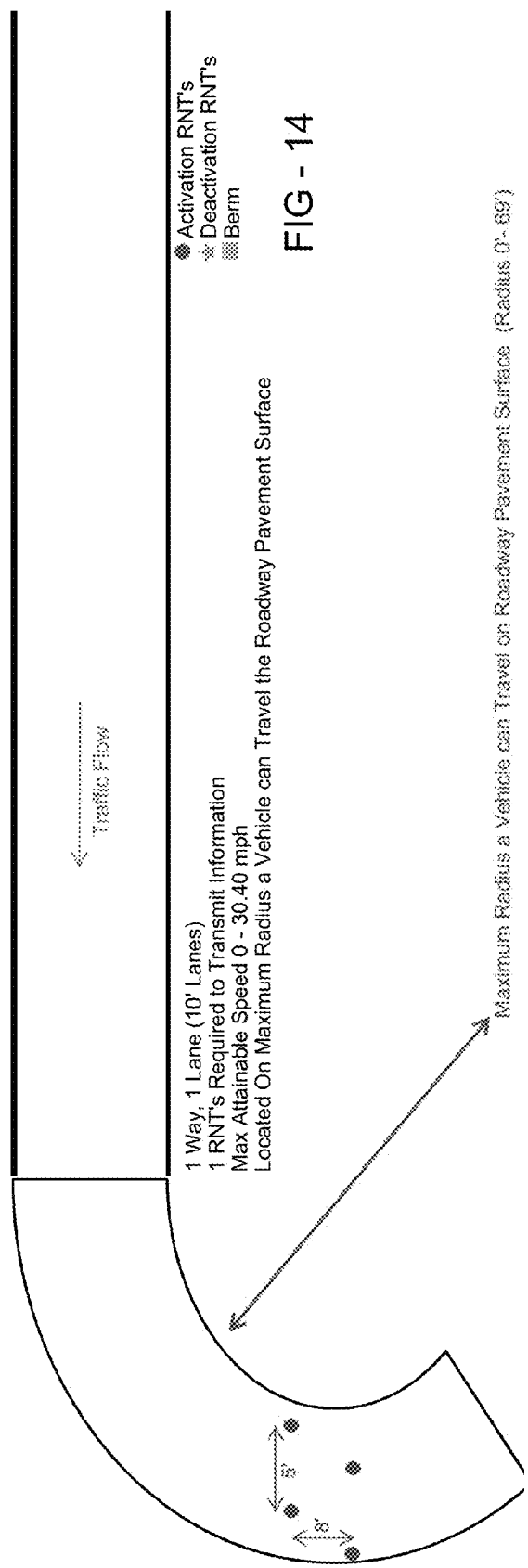
Figure 15:
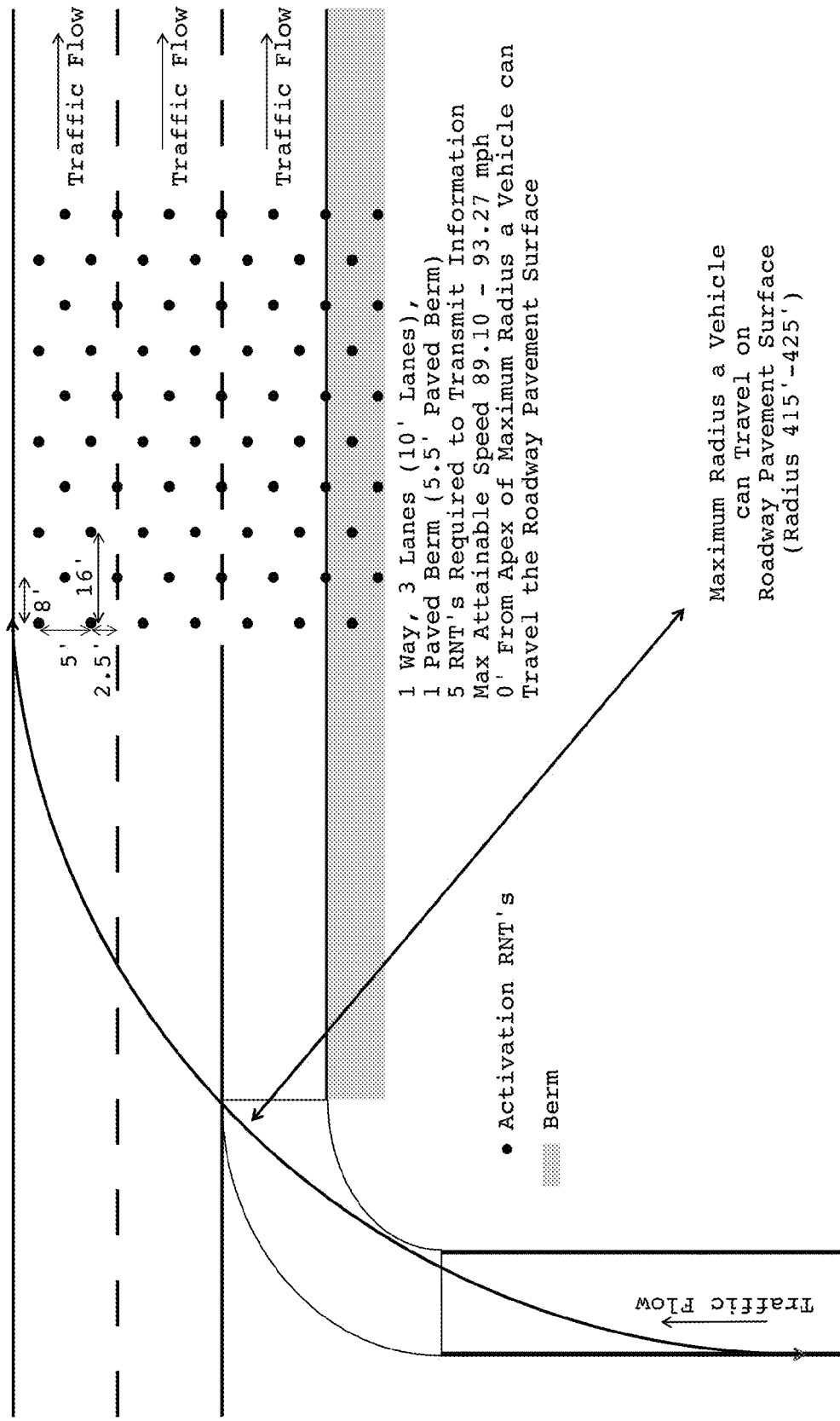
Figure 16:
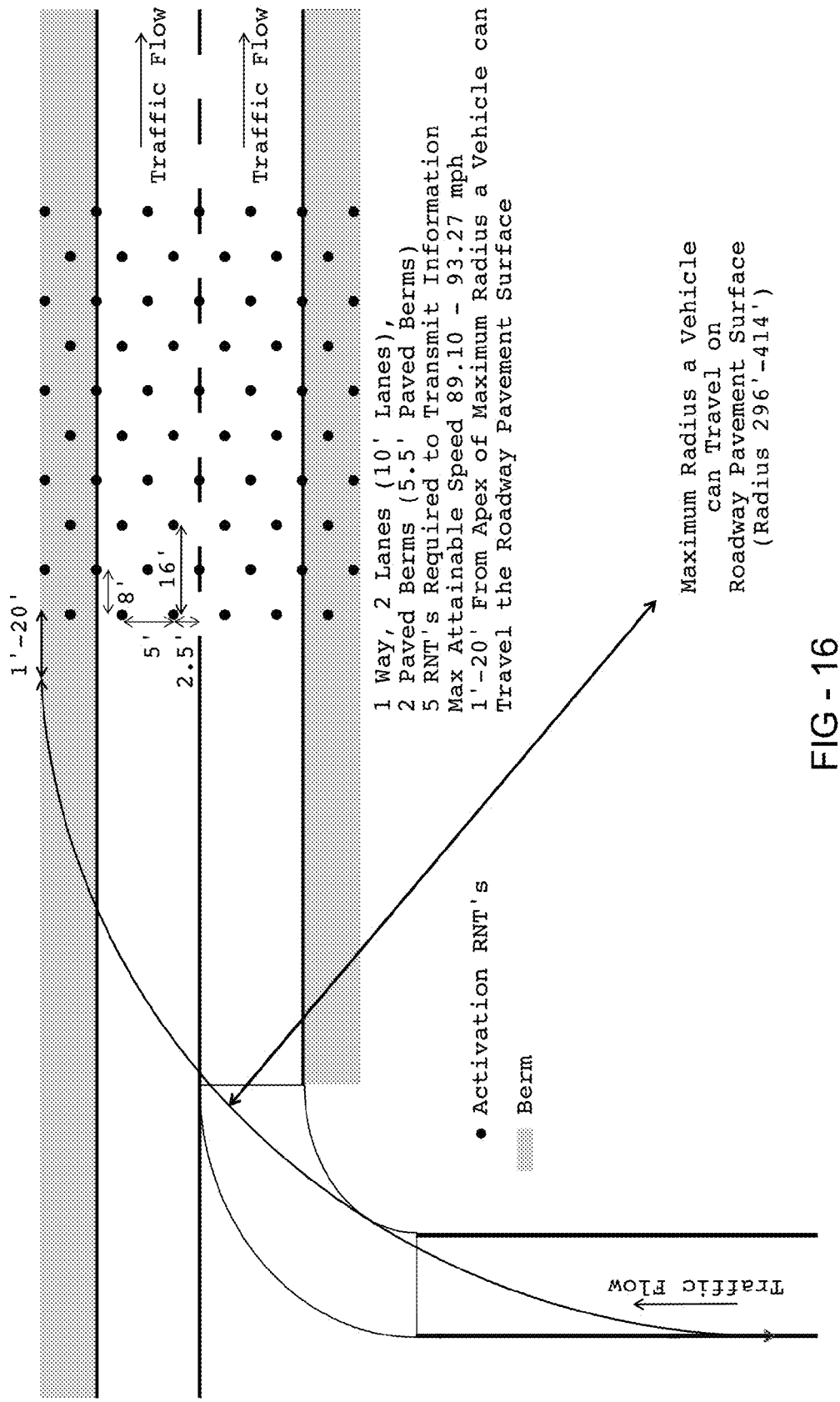
Figure 17:
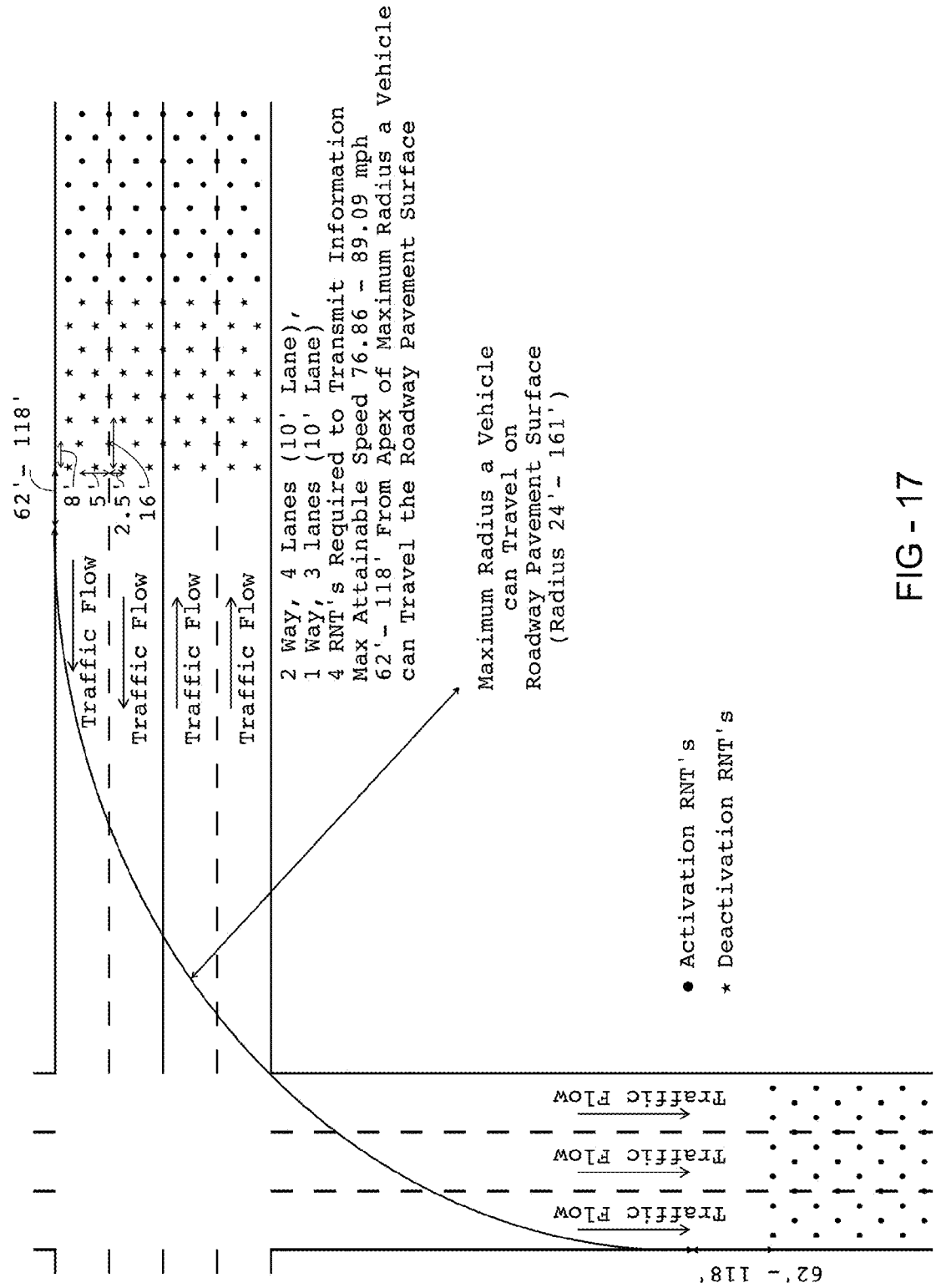
Figure 18:
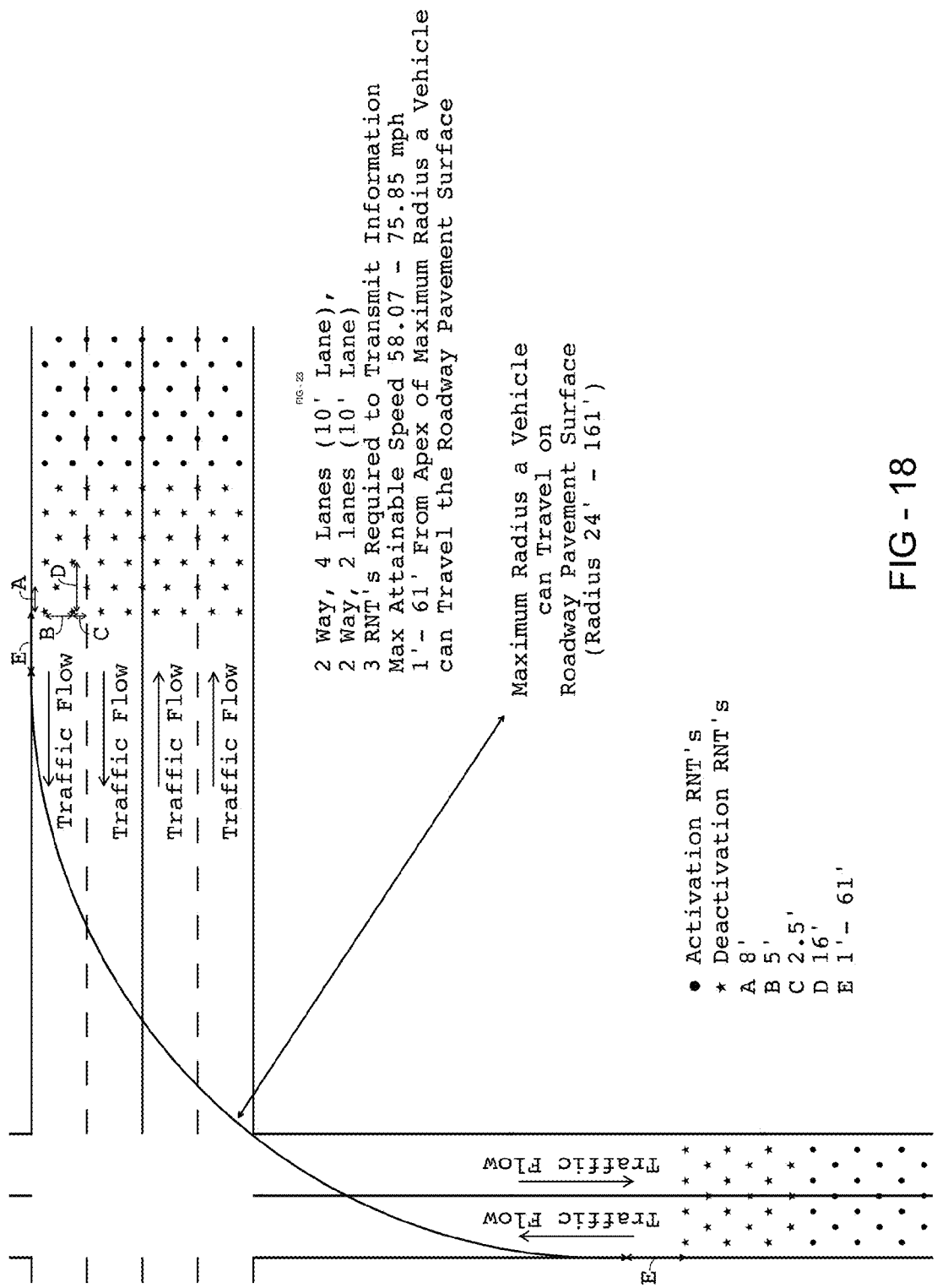
Figure 19:
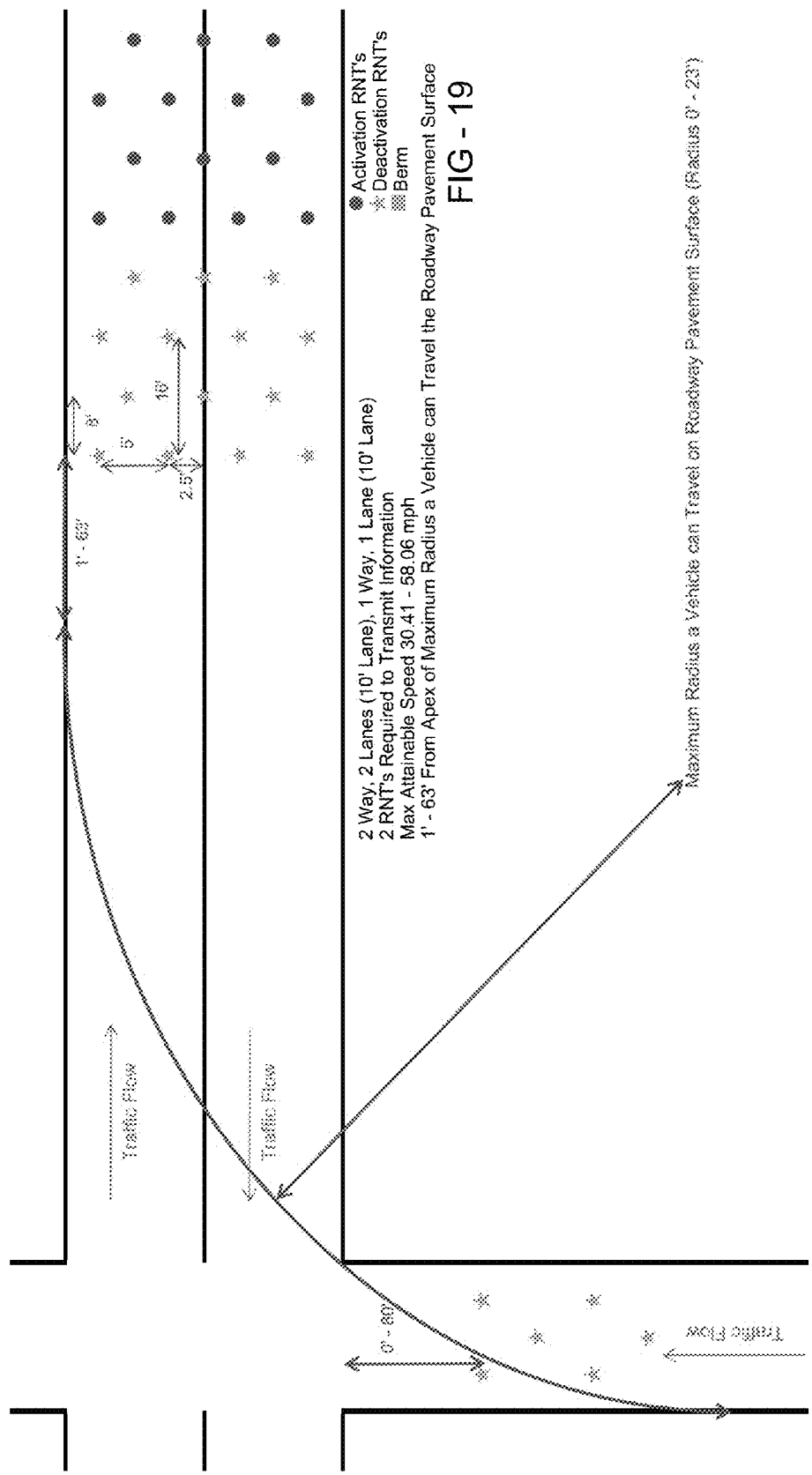
Figure 20:
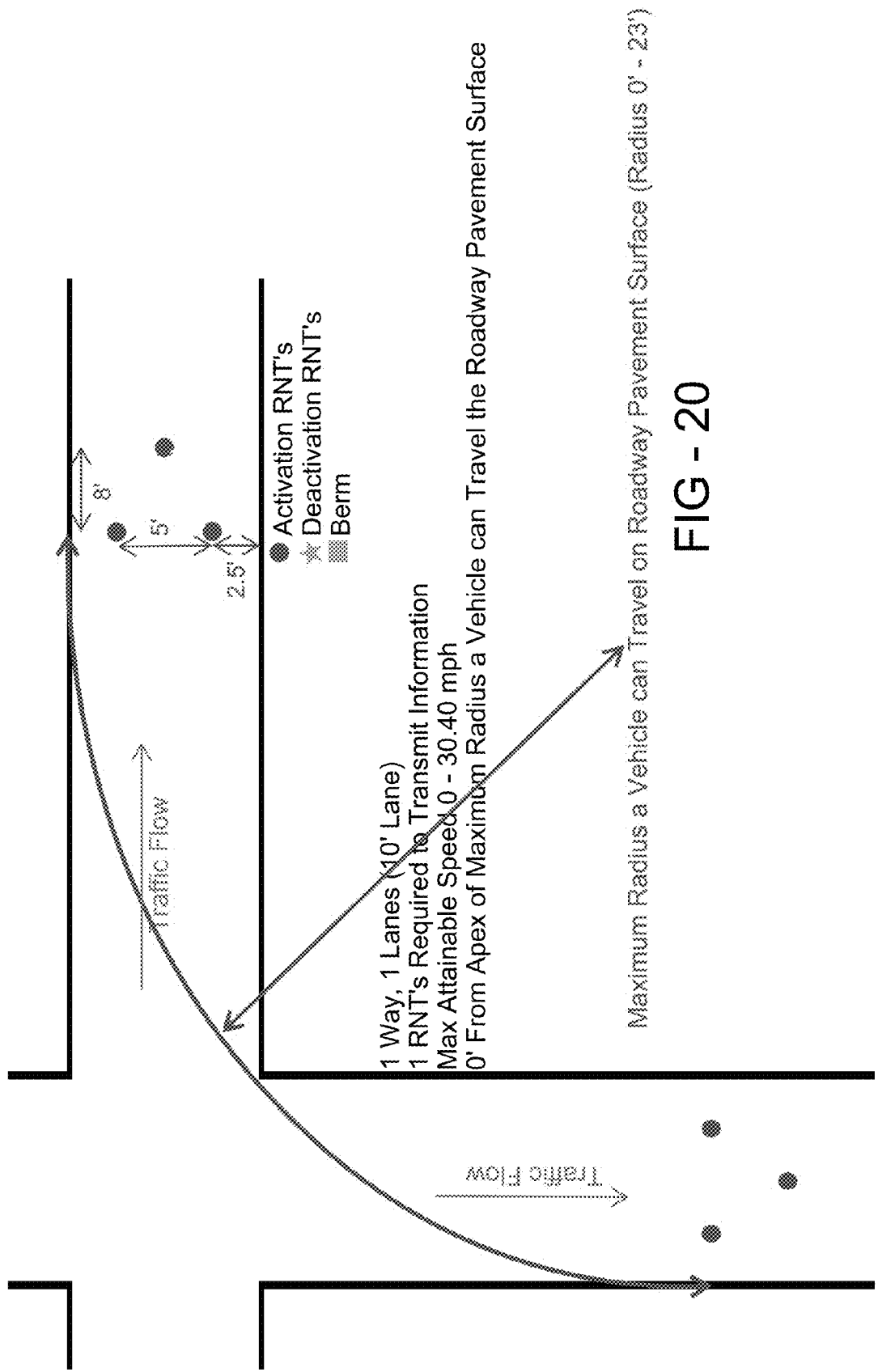
Figure 21:
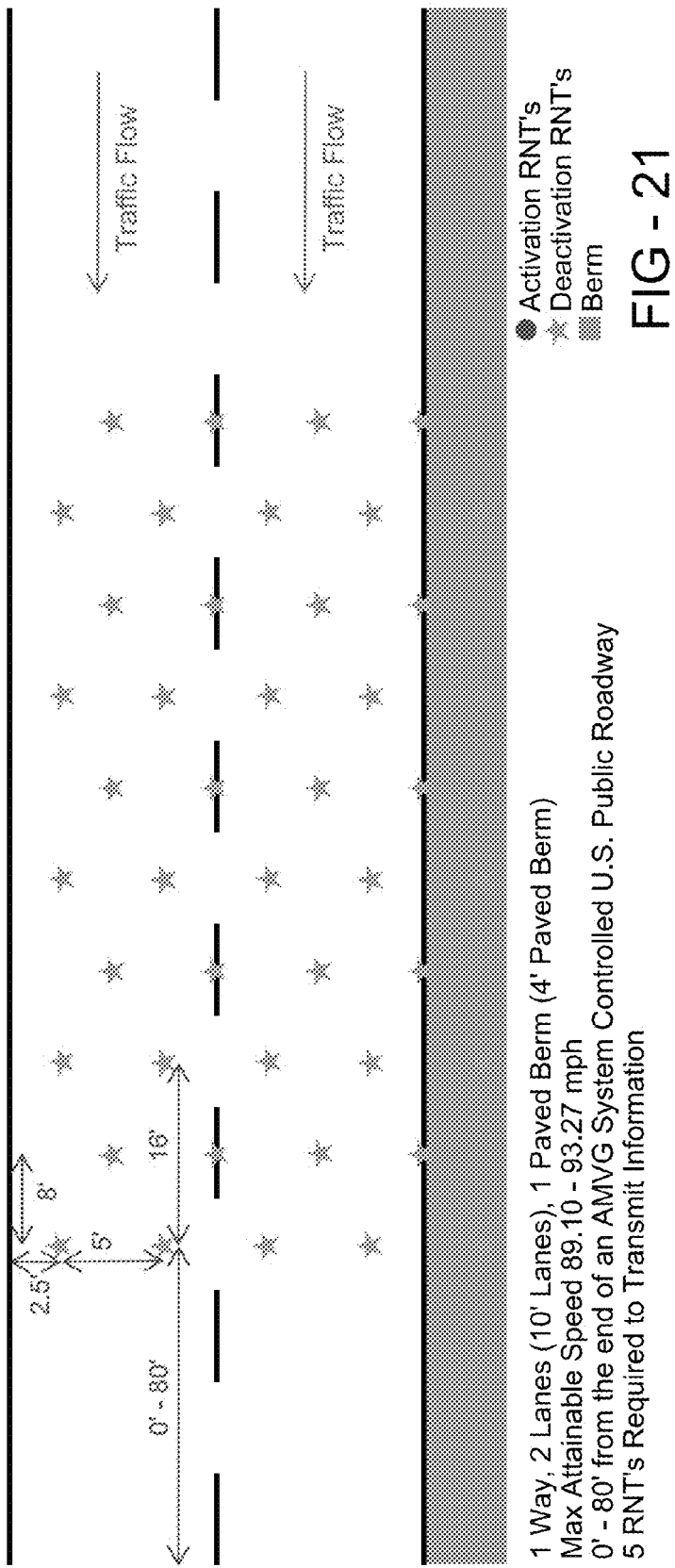
FIGS. 21-25 show schematics for several embodiments of locations of the SLIZs.
Figure 22:
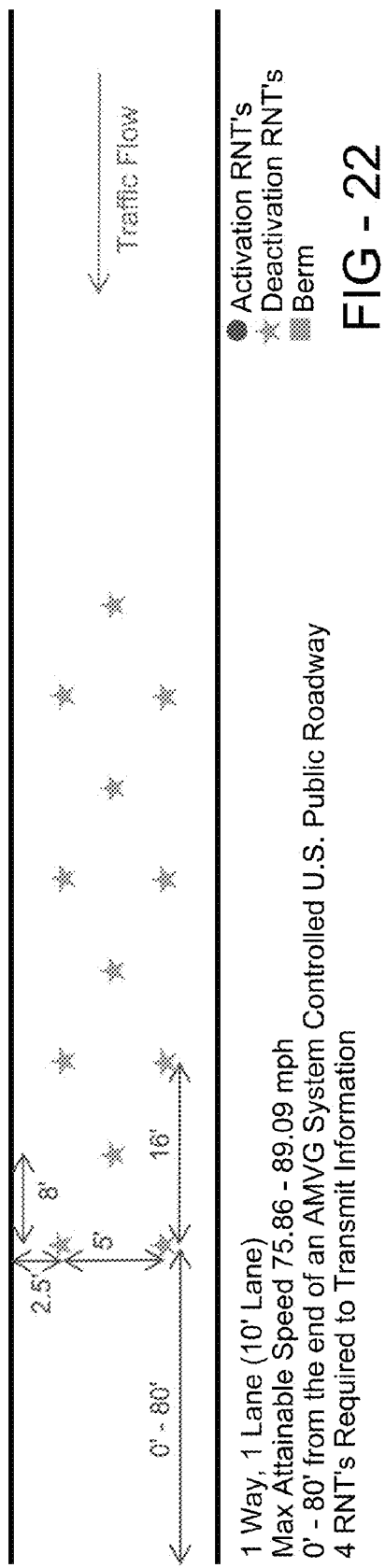
Figure 23:
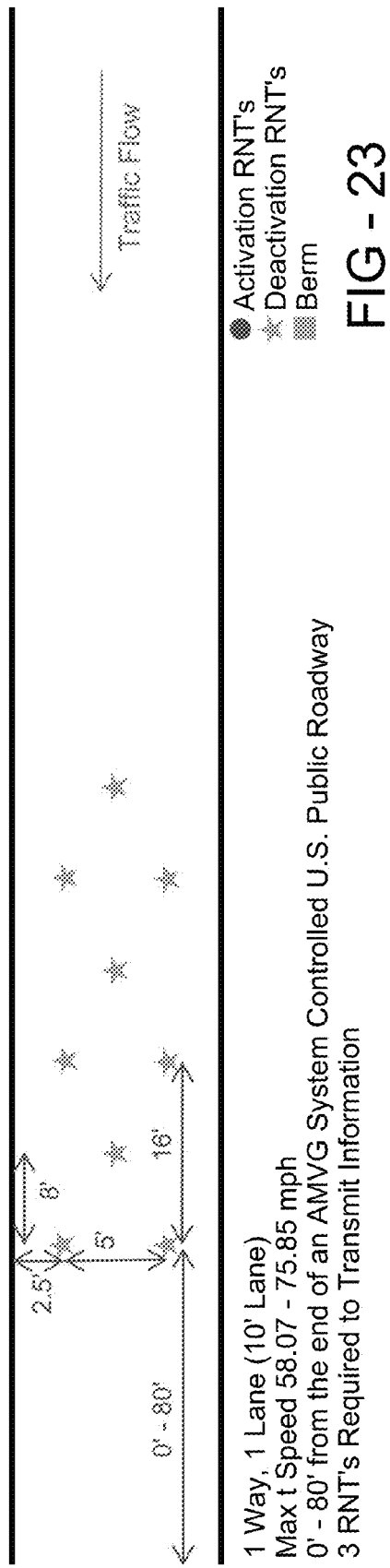
Figure 24:
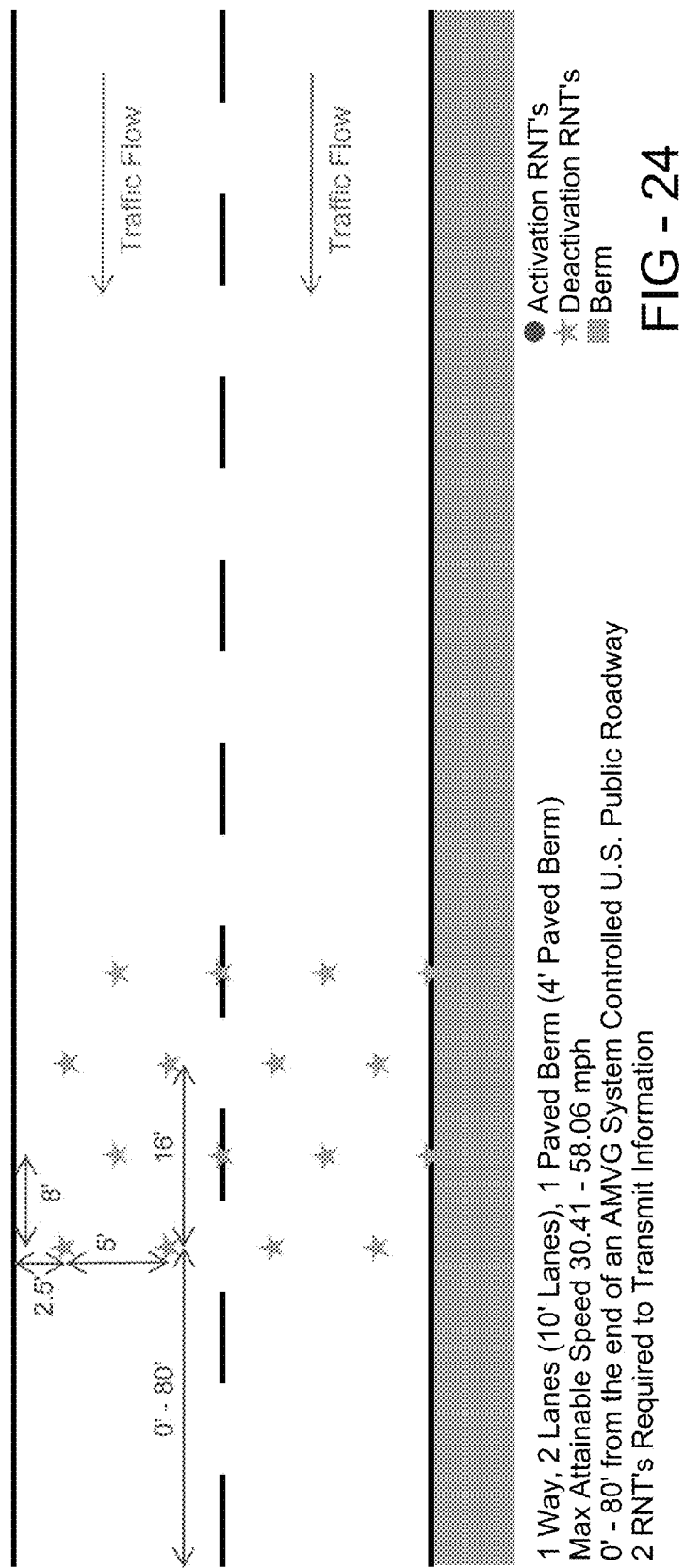
Figure 25:
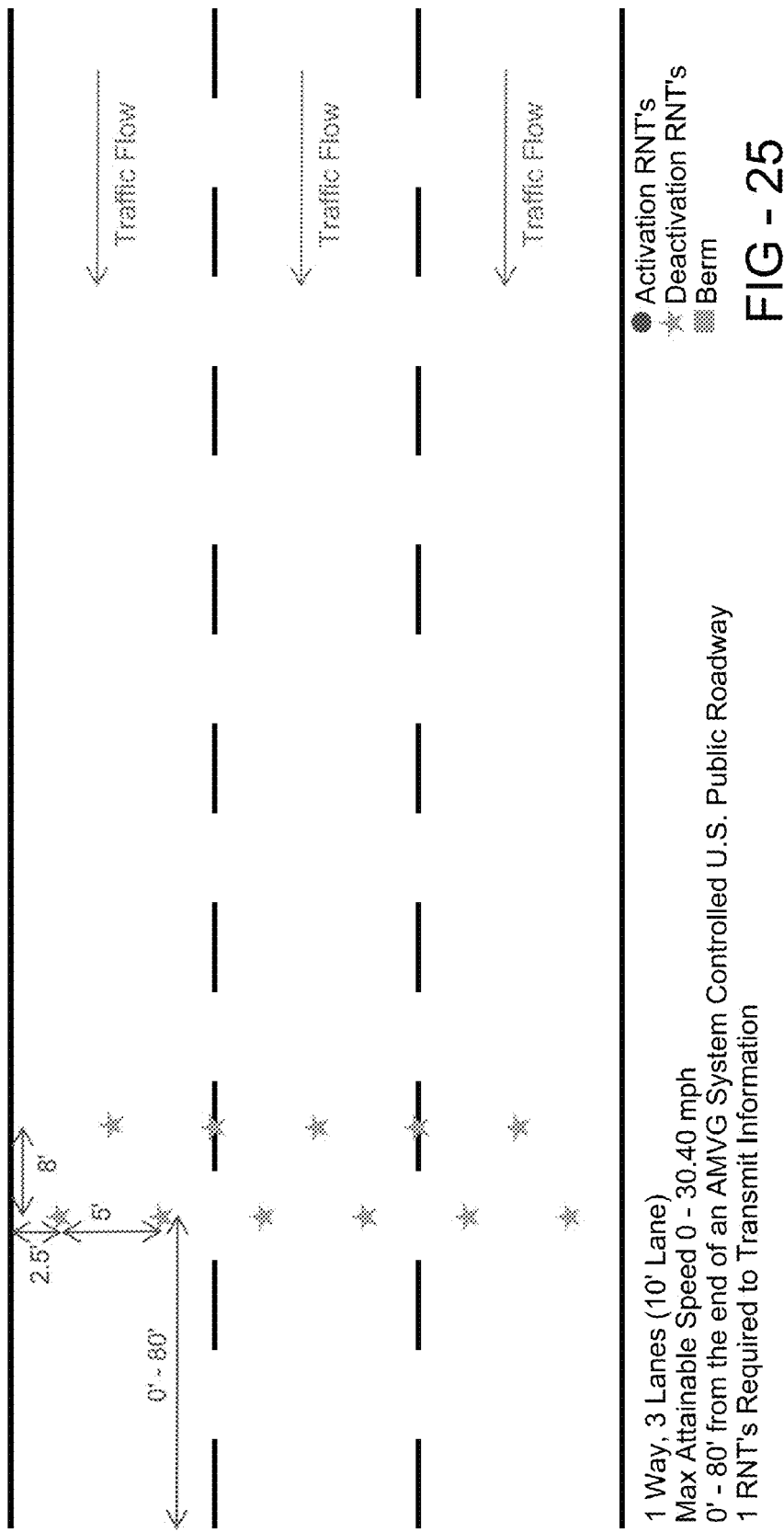

The invention is described more fully herein after with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete and will fully convey the scope of the invention to those skilled in the art. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It is preferable that the speed limit data stored on the RNTs be encrypted to increase security and prevent public delinquency. The format of the information transmitted from the RNTs should be identifiable as authentic to avoid the AMVG System from being used in a delinquent manner. To ensure the authenticity of information transmission, an algebraic code may be created using the 16-character, eight position data storage format or 64 bit memory available on a Low Frequency 120 mm RFID transponder to secure the system's operation.

Read only RFID transponders may be used to prevent delinquent avoidance of the AMVG Systems control. It may be preferable to isolate any potential delinquent avoidance or manipulation of the system and as a result read only RFID transponders should be used for the system to perform properly.

This application of RFID technology is new and has design constraints which may test the limits of this technology. Although not required, using 120 mm transponders will satisfy the read distance constraints required for the AMVG System to operate. The RFID antenna examples shown below have been designed to ensure the size and strength necessary to charge and receive information from the RNTs at the speeds to which this device will be applied, however many designs of possible antennas would work with the exemplary embodiments herein. Additionally, RNTs may be oriented in a manner that allows for the fastest charge rate.

Low frequency RFID transponders are passive and require no battery or power source to operate. These RFID transponders use induction to charge a small capacitor within. This capacitor holds the required charge and releases it to transmit the data contents stored on the RFID transponder through the RFID antenna to the RFID reader. Induction passes a charge between two coils of wire through the air and this process requires the coils between which the charge is transmitted to be aligned with the magnetic field generated. As a result, the RFID transponder should be oriented like a bullet entering a target for the most efficient operation.

It is preferable to have SLIZs in each location at which the speed limit changes or an access point (on ramps and intersections) is passed on a roadway with a speed limit greater than or equal to 50 mph. It is also preferable to have multiple SLIZs on an AMVG System controlled highway even if the speed limit does not change or an access point is passed. This may provide added security. Repetitive transmission of information allows for more accuracy and prevention of public delinquency in the system's operation. It also allows the speed governing In-car Device to time out and stop controlling the speed of an AMVG System controlled motor vehicle after a specified distance of travel. This will ensure an AMVG System controlled motor vehicle can operate at any speed, whether legal or not, on a U.S. public roadway not controlled by the AMVG System or on private property.

RNTs are preferably placed frequently enough to allow for correct operation of the AMVG System. Since the RNTs are to be read by a motor vehicle moving at speeds sometimes in excess of 70 mph, repetitive, identically programmed transponders are preferred. This will allow for more accurate reading of the data stored on the transponders (the speed limit of the U.S. public roadway being traveled). The layout of transponders should preferably cause all passing motor vehicles to pass within the read range of 1 to 5 RNTs, preferably guaranteeing two authentic signal transmissions occur when passing over a SLIZ.

Research regarding how LF RFID technology reacts and functions when communicating information between objects moving at speeds greater than 50 mph is not readily available to the public. The technology's specifications, however, suggest there are no limitations with respect to the rate of speed at which the RFID antenna magnetic field and RFID transponder can pass and still transmit information, as long as the RFID system is designed properly. The most important factor affecting the information transmission speed is the amount of time an RFID transponder is within the RFID antenna's charge and signal transmissions range. The current off-the-shelf RFID reader constraints allow a minimum magnetic field pulse/RFID transponder charge duration of 15 ms and minimum radio signal observation/RFID transponder signal transmission duration of 20 ms. These factors define RFID transponder charge/read cycle to be 35 ms. Therefore, the higher rate of speed at which the RFID antenna magnetic field and RFID transponder pass, the larger the RFID antenna magnetic field must be in order to ensure the RFID transponder is within the RFID antenna's charge/signal transmission range to ensure two full RFID transponder charge/read cycles occur.

RFID signal transmission is typically subject to electromagnetic noise interference. As a result, the industry standard is to require two or more signal transmissions to ensure authentic information is communicated.

A simulation of the physical components for one possible design of the AMVG System has been created and provides valuable insight. Computer simulations provide the capability to model a physical activity using statistically based parameters and execute the activity many times in a short period of time to determine how it will perform. The following section sets forth an explanation and results of an example of a computer simulation model used for the exemplary embodiments of the AMVG System.

The computer simulation model utilizes two entities: one represents the vehicle traveling over the RFID transponders and the other represents the signal emitted from the RFID antenna in the vehicle. There is a uniform distance between each of the RFID transponders and the vehicle travels at a constant speed while passing over the RFID transponders.

The model begins by creating both entities at the same time with a random start time between 0 and 35 ms. This random start time is used to represent the varying charge/read cycle random start times resulting from a vehicle initiating the RFID communication charge/read cycle time. This cycle affects when information is transmitted and, as a result, determines whether or not information can be transmitted via RFID technology. A full 15 ms magnetic field pulse/RFID transponder charge duration and consecutive 20 ms radio signal observation/RFID transponder signal transmission is typically required, while the RFID transponder is within the RFID antenna's charge/signal transmission range, for RFID technology to transmit information. If the RFID antenna, or more importantly, its magnetic field/listening range is not sufficient, RFID technology cannot transmit information.

The vehicle entity first receives an individual ID to track the entity and then is delayed a calculated time determined by the speed of the vehicle and the distance between the RNTs before it reaches the first RNT to ensure the signal entity has started. The vehicle is then preferably delayed for the time that the vehicle is over the RNT. This is a function of speed and RFID antenna magnetic field length. During this delay, the vehicle is waiting for the signals (See Signal Delivery below).

If both signals are received in correct order, the remainder of the delay may be postponed to ensure that the entire length of the vehicle travels over the RNT. Next, the vehicle is preferably delayed for the remainder of the distance between RNTs and then proceeds to the next RNT. This process in this embodiment is repeated five times and represents the maximum number of RFID transponders (RNTs) that a motor vehicle could cross in actual system operation.

Using the simulation to represent a motor vehicle crossing 5 RNTs for every individual simulation provides the statistical information necessary to determine how many RNTs must be passed at a given speed to ensure at least two signal transmissions occur (the required amount of signal transmissions to ensure authentic repetitive information is communicated).

If both signals are not received in correct order, there is no need to delay the rest of the distance because the vehicle has traveled the length of the RFID antenna magnetic field over the RFID Transponder and did not receive a signal. Next, the vehicle may be delayed for the remainder of the distance between RNTs and then proceeds to the next RNT. This process may then be repeated for each assigned RNT.

Signal Delivery—In order to ensure that the data from the RNT is received, the entire charge and read cycle should be accounted for, including precedent of order. To express this logically, two signals are sent: the first indicates the start of the charge cycle 15 ms and the second indicates the end of the discharge cycle 20 ms. The signals should be received in the order of charge signal, then discharge signal in order for the data from the RNT to be received.

The statistically modeled performance evaluation describes the actual operating constraints defined by the physical limitations of the multiple components configured in a manner not previously evaluated and comprised in the AMVG System. The results are shown in Table 1 below. The parameters of the AMVG Systems specifications modeled in the simulation are as follows:

RFID reader charge time—15 ms
RFID reader read time—20 ms
RFID reader charge/read cycle time—35 ms
RFID reader charge/read cycle time randomizer—0 ms to 35 ms
RFID antenna magnetic field length—7.5 ft
RNT SLIZ quantity—5 RFID transponders
RNT spacing—8 ft

TABLE 1

| | Exact MPH (using Linear Interpolation) |
|---|---|
| Receive 2 out of 5 RNTs with 100% Accuracy | 93.27 |
| Receive 2 out of 4 RNTs with 100% Accuracy | 89.09 |
| Receive 2 out of 3 RNTs with 100% Accuracy | 75.85 |
| Receive 2 out of 2 RNTs with 100% Accuracy | 58.06 |
| Receive 2 out of 1 RNTs with 100% Accuracy | 30.40 |

The table above shows that if speeds of a motor vehicle traveling on a U.S. public roadway is less than or equal to 93 mph, 5 RNTs are required; less than or equal to 89 mph, 4 RNTs are required; less than or equal to 75 mph, 3 RNTs are required; less than or equal to 58 mph, 2 RNTs are required; and less than or equal to 30 mph, 1 RNT is required to ensure that 2 RFID signal transmissions occur. Speeds over 70 mph are not typically controlled or legal, but there are situations in which a motor vehicle could accelerate above a speed where RFID signal transmission can occur. Therefore, identifying and understanding these limitations will determine the placement and quantity of RNTs required to ensure complete speed control.

Regarding transponders, two types may be used in various embodiments of the invention. First, read only passive RFID transponders may be used (ex. Texas Instruments Part Number: RI-TRP-R9TD or similar). Second, read/write active RFID transponders may be used (ex. Texas Instruments Part Number: RI-TRP-D9TD). The specifications for these can be found at www.ti-rfid.com and are herein incorporated by reference as though fully recited herein.

Each type of transponder may be used in a number of different situations. Passive RFID Transponders may be used as Activation RNTs: roadway speed limit control (ex. 0 mph-93 mph preferably as defined by the simulation), multiple point roadway speed limit control for vehicles required to operate at different speed limits than general traffic (ex. 0 mph-93 mph preferably as defined by the simulation), in one exemplary embodiment preferably with a distance of speed limit control for 6,000 ft, but can be any specified distance or no distance at all. Passive RFID Transponders may also be used as Deactivation RNTs. Speed Governor Control Removal: Deactivation RNTs may clear the current motor vehicles speed limit control, but can further limit the motor vehicles speed to 93 mph for preferably 160 ft, but can be any specified distance or no distance at all, in order to enhance the performance of the AMVG System thereby requiring fewer RNTs to be installed, while still ensuring the speed limit information is properly communicated to a motor vehicle operating on an AMVG System controlled U.S. public roadway.

Passive RFID Transponders may also be used as Utility RNTs for roadway safety information (ex. stop signs, yield signs, merge signs, or roadway name signs) and/or public information signs (ex. airports, restaurant, retail stores, gas station, parks and tourist attractions).

Passive RFID Transponders may also be used as Temporary RNTs, temporarily controlling the speed limit of a roadway in an isolated area (ex. Construction zones, festival/marathon/public events, and other temporary safety zones).

Active RFID transponders may be used as Dynamic RNTs. Because Active RNTs are not passive like Activation, Deactivation, Utility and Temporary RNTs, they do not receive their power to transmit information via the magnetic field created by the RFID antenna and RFID reader attached to an AMVG System equipped motor vehicle. Dynamic RNTs may be wired to a power source and will be connected to a computer network, which may be updated in real time to provide motorist information vital to their safety, well-being, roadway traffic information and marketing information, among others.

Layout

The relative placement of each type of RNT will now be discussed. As mentioned above, there can be at least five types of RNTs: Activation RNTs, Deactivation RNTs, Utility RNTs, Temporary RNTs and Dynamic RNTs. SLIZs will include approximately 3-50 RNTs per lane of traffic, determined by the lane's width, the speed limit and maximum attainable speed of the U.S. public roadway being controlled by the AMVG System and placed in a staggered manner. The layout of RNTs in a SLIZ is designed to be independent of the roadway size and/or number of lanes, generalizing the specifications for all installation applications. As a result, the installation of the RNTs will start on one side of the roadway and proceed as identified below, until reaching the other edge of an AMVG System controlled U.S. public roadway pavement surface. This design assures that at any position on an AMVG System controlled roadway, a motor vehicle cannot pass a SLIZ without crossing the required number of RNTs that assure the speed limit of the roadway is properly communicated to passing motor vehicles and therefore the speed limit of a motor vehicle is controlled.

FIG. 1 shows roadway 170 with SLIZ 180 comprised of an Activation Zone containing Activation RNTs 30 and a Deactivation Zone containing Deactivation RNTs 40. The Activation RNTs 30 and Deactivation RNTs 40 are oriented with spacing A perpendicular to the flow of traffic, oriented with spacing D parallel to the flow of traffic and offset with spacing O perpendicular to the flow of traffic. Also shown here is a motor vehicle 160 having an antenna 50 that generates a magnetic field measuring L in a direction parallel to the traffic flow and W in the direction perpendicular to the traffic flow. As noted above and below, antennas can be produced in a wide variety of styles and physical dimensions, so for the purpose of simplicity here the exemplary embodiments of the invention have been described in view of the magnetic field dimensions L and W, as many different types of antennas would work with the exemplary embodiments herein.

In one example the first row of RNTs should preferably be positioned starting at some offset (ex. 2.5 ft) off the edge of the pavement surface (this placement maybe within the paved berm of the roadway). The second RNT should preferably be positioned at distance A (ex. 5 ft) from the first RNT in the direction away from the edge of the pavement surface where the SLIZ installation began. Both RNTs should preferably be positioned in a line perpendicular to the flow of traffic. This pattern should preferably continue all the way across the roadway, with approximately distance A spacing, with the last RNT installed near the edge of the pavement surface opposite of where the SLIZ installation began.

The next row of RNTs should preferably be positioned at distance D (ex. 8 ft) forward in the direction of the flow of traffic in the lane where the installation began and installed parallel to the first row of RNTs, starting at a larger offset (ex. 5 ft) from the edge of the pavement surface where the SLIZ installation began (this placement may be within the paved berm of the roadway). The second RNT should preferably be positioned at distance A (ex. 5 ft) from the first RNT in a direction away from the edge of the pavement surface where the SLIZ installation began. Both RNTs should preferably be positioned in a line parallel to the first row of RNTs installed. This pattern will continue all the way across the roadway, with approximate distance A spacing, with the last RNT installed near the edge of the pavement surface opposite of where the SLIZ installation began.

The design specification for the installation of RNTs for the first and second rows of a SLIZ is preferably repeated in the same alternating sequence as identified by the speed limit of the roadway being controlled and outlined in the frequency section below.

Frequency

Roadway Network SLIZs may be located at least in the following locations on U.S. public roadways controlled by the AMVG System. There are typically two categories of roadways: freeway U.S. public roadways and arterials/collectors/local U.S. public roadways. A freeway U.S. public roadway is generally categorized as a road that has no traffic lights or required stopping points (excluding toll ways/mandatory personnel or vehicle inspections). These roads generally have no intersections and are accessed using on ramps and exited using off ramps. Arterials/collectors/local U.S. public roadways contain intersections, traffic signs, traffic lights and required stopping points.

The ingress to an exemplary AMVG System controlled roadway will now be discussed. These AMVG System design constraints may be calculated using the statistical data determined by the simulation model presented in Table 1 above. The specifications may consist of two components. The component applied to a specific situation is determined by the application that maximizes the AMVG System's performance and minimizes the quantity of RNTs required to be installed. SLIZs may be located on roadways not controlled by the AMVG System. These installations may occur when the roadway being controlled does not provide a location that meets the required specification necessary to properly control the speed of a motor vehicle operating on an AMVG System controlled U.S. public roadway. The two components of the specifications are as follows: (1) RNTs are placed at a specified distance from the last required stopping point on an AMVG System controlled U.S. public roadway; (2) RNTs are placed on a radius or at a specified distance from the apex of a radius, where a motor vehicles speed is restricted by non-linear travel of the motor vehicle, on an AMVG System controlled U.S. public roadway.

The first component of the specification is placement of RNTs at a specified distance from the last required stopping point on an AMVG System controlled U.S. public roadway. For example, using the information in the table above, a distance at which the fastest current street legal motor vehicle (ex. Maxximus G-Force 0-60 mph in 2.134 s) can reach the speed at which 2 signals are received out of 5 RNTs, 2 signals are received out of 4 RNTs, 2 signals are received out of 3 RNTs, 2 signals are received out of 2 RNTs, 2 signals are received out of 1 RNT. These distances are determined by calculating the time period at which the fastest current street legal motor vehicle can reach the speeds identified in the table above 93.27 mph, 89.09 mph, 75.85 mph, 58.06 mph and 30.40 mph using the equation below.

$v^2$=initial velocity
$v^f$=final velocity
a=acceleration
t=time
d=distance $$a=(v^f-v^2)/t$$

$$t=(v^f-v^2)/a$$

$$d=\frac{1}{2}(v^f+v^2)t$$

In the case of a motor vehicle that is capable of accelerating from 0-60 mph in less time than 2.134 s, it requires a specially designed RFID antenna with increased magnetic field strength and an RFID reader with a reduced charge/read time mathematically calculated lower than the standard design time period of 35 ms, which will allow the SLIZ design to properly control the speed of the vehicle. RNTs will preferably be installed across the entire roadway, including both directions of traffic flow, unless there is a barrier between the lanes of different directions of traffic flow, to prevent delinquent avoidance of the AMVG Systems control. Table 2 shown below outlines the maximum attainable speed ranges and associated distance ranges from the last required stopping point necessary to properly control the speed of a motor vehicle operating on an AMVG System controlled U.S. public roadway.

TABLE 2

| Transmission Speed (mph) | Number of RNT's | SLIZ Distance From Last Required Stopping Point (ft) |
|---|---|---|
| 00.00 > 30.40 | 1 | 0.00-8.00 |
| 30.41 > 58.06 | 2 | 9.00-55.00 |
| 58.07 > 75.85 | 3 | 56.00-102.00 |
| 75.86 > 89.09 | 4 | 102.00-143.00 |
| 89.10 > 93.27 | 5 | 144.00-147.00 |

FIGS. 2-11 provide a schematic layout for several examples of the location of these SLIZs. These figures represent examples of each specification outline in the table above but do not show every possible embodiment. All RNT quantities, distances from the last required stopping point, maximum attainable speeds, number of lanes, lane widths and pavement surface size can be interchanged to apply to all potential roadway applications.

The second component of the specification is the placement of RNTs on a radius or specified distance from the apex of a radius, where non-linear travel restricts the speed of the motor vehicle traveling on an AMVG System controlled U.S. public roadway. In order to determine where to place RNTs on a radius, the maximum radius dimensions to restrict the speed to 93.27 mph at which 2 signals are received out of 5 RNTs, 89.09 mph at which 2 signals are received out of 4 RNTs, 75.85 mph at which 2 signals are received out of 3 RNTs, 58.06 mph at which 2 signals are received out of 2 RNTs, 30.40 mph at which 2 signals are received out of 1 RNT may be determined.

In order to determine where to place RNTs at a distance from the apex of a radius, the maximum radius dimensions to restrict the speed to 75.05 mph, 74.04 mph, 62.57 mph, 40.30 mph, 17.63 mph should preferably be determined. The foregoing speeds are lower than the speeds used to calculate RNT placements on radiuses because the linear travel/ increased potential speed possible when RNTs are placed on a linear section of roadway after a radius.

Below are the equations used to determine the maximum radius size and distance from the apex of a radius that RNTs must be placed in order for the speed limit of the road to be communicated to a passing motor vehicle.

r=radius
v=velocity
g=gravity
μ=coefficient of friction
θ=bank angle $$r=(v^2/g)(1-\mu \tan\theta/\tan\theta+\mu)$$

$v^2$=initial velocity
$v^f$=final velocity
a=acceleration
t=time
d=distance $$t=(v^f-v^2)/a$$

$$d=\frac{1}{2}(v^f+v^2)t$$

Using 0.75 as the coefficient of friction provides a conservative specification, assuring accuracy and performance of the AMVG System. The following calculations are determined from the equation above and allow for a maximum bank angle of θ=8% or 4.57°. These design specifications are used as an example but only represent the AMVG System design specifications for this specific example. The equations above may be adjusted for other design specifications and extrapolated based on the procedures outlined below to determine the AMVG System's specifications for each application.

Table 3 below outlines the maximum attainable speed ranges and associated roadway radius sizes where RNTs are placed on the roadway radius. These locations may be utilized to maximize the performance of the AMVG System operation limits by restriction of the speed of a motor vehicle as a result of non-linear travel and required to properly control the speed of a motor vehicle operating on an AMVG System controlled U.S. public roadway.

TABLE 3

| Transmission Speed (mph) | Number of RNT's | SLIZ Radius (ft) |
|---|---|---|
| 00.00 > 30.40 | 1 | 69.00 |
| 30.41 > 58.06 | 2 | 254.00 |
| 58.07 > 75.85 | 3 | 434.00 |
| 75.86 > 89.09 | 4 | 599.00 |
| 89.10 > 93.27 | 5 | 657.00 |

Table 4 below outlines the maximum attainable speed ranges and associated distance ranges, where RNTs are placed at specified distances from the apex of a roadway radius. These locations may be utilized to maximize the performance of the AMVG System operation limits by restriction of the speed of a motor vehicle as a result of non-linear travel and properly control the speed of a motor vehicle operating on an AMVG System controlled U.S. public roadway.

TABLE 4

| Transmission Speed (mph) | Number of RNT's | SLIZ Location From Tangent of Radius 0' > 23' (ft) | SLIZ Location From Tangent of Radius 24' > 161' (ft) | SLIZ Location From Tangent of Radius 162' > 295' (ft) | SLIZ Location From Tangent of Radius 296' > 414' (ft) | SLIZ Location From Tangent of Radius 415' > 425' (ft) |
|---|---|---|---|---|---|---|
| 00.00 > 30.40 | 1 | 0 | — | — | — | — |
| 30.41 > 58.06 | 2 | 1.00-63.00 | 0 | — | — | — |
| 58.07 > 75.85 | 3 | 64.00-126.00 | 1.00-61.00 | 0 | — | — |
| 75.86 > 89.09 | 4 | 127.00-183.00 | 62.00-118.00 | 1.00-56.00 | 0 | — |
| 89.10 > 93.27 | 5 | 184.00-201.00 | 119.00-138.00 | 57.00-76.00 | 1.00-20.00 | 0 |

SLIZs may be placed on the radius or at the apex of the radius, with the radius measured of the fastest travelable route. FIGS. 12-20 provide a schematic of several examples for the location of these SLIZs. These figures represent examples of each specification outlined in the table above but do not show every specified design application. All RNT quantities, radius sizes, distances from the apex of radiuses, maximum attainable speeds, number of lanes, lane widths and pavement surface sizes can be interchanged to apply to all potential roadway applications.

In an exemplary embodiment of an AMVG System controlled U.S. public roadway, SLIZs may be located at a distance up to the programmed distance of speed limit control of Activation RNTs, but should preferably be located every 5,500-5,660 ft from the SLIZ that could be the immediately preceding SLIZ and is the farthest away (SLIZ locations could be based from an on ramp, an intersection, the other direction of traffic flow with access to a new control zone via a U turn or last Standard Control Zone), with the required number of RNTs crossed set forth in Table 5 below. The layouts of the SLIZs are similar to the designs identified in FIGS. 2-11.

TABLE 5

| U.S. Public Roadway Speed limit (mph) | Activation RNT's |
|---|---|
| 5 | 1 |
| 10 | 1 |
| 15 | 1 |
| 20 | 1 |
| 25 | 1 |
| 30 | 1 |
| 35 | 2 |
| 40 | 2 |
| 45 | 2 |
| 50 | 2 |
| 55 | 2 |
| 60 | 3 |
| 65 | 3 |
| 70 | 3 |
| 75 | 4 |
| 80 | 4 |
| 85 | 4 |
| 90 | 4 |
| 93 | 5 |

The following describes an exemplary embodiment for the egress of an AMVG System controlled freeway or arterial/collector/local U.S. public roadway. There are typically two different specifications for the placements of SLIZs when exiting an AMVG System controlled U.S. public roadway.

The first specification for installing Deactivation RNTs is on an AMVG System controlled freeway or arterial/collector/local U.S. public roadway based upon the speed limit of the road and may be located at a distance up to the programmed distance of speed limit control of Activation RNTs, but preferably 0-80 ft back from an intersection/traffic light/traffic sign/required stopping point or end of an AMVG System controlled U.S. public roadway, on a U.S. public roadway not intersecting with another AMVG System controlled U.S. public roadway. The layouts of the SLIZs for a Deactivation Zone are substantially similar to FIGS. 2-6 shown above, except the RNTs will be Deactivation RNTs and programmed to preferably deactivate the AMVG System's control of a motor vehicles speed to 93 mph for 160 ft and then preferably no control after 160 ft. RNTs may preferably be installed across the entire roadway including both directions of traffic flow, unless there is a barrier between the lanes of different directions of traffic flow, to prevent delinquent avoidance of the AMVG System's control. The Deactivation RNT SLIZ quantities are set forth in Table 6 below. FIGS. 21-25 show schematics for several embodiments of locations of these SLIZs.

The second specification for installing Deactivation RNTs is on an AMVG System controlled freeway or arterial/collector/local U.S. public roadway intersecting an AMVG System controlled U.S. public roadway. Deactivation RNTs will preferably be placed in accordance with the ingress specifications outlined above. RNTs will be preferably installed across the entire roadway, including both directions of traffic flow, unless there is a barrier between the lanes of different directions of traffic flow, to prevent delinquent avoidance of the AMVG Systems control. The Deactivation RNT SLIZ quantities are identified in Table 6 below. Some examples for the locations of these SLIZs are shown in FIGS. 7-11, 17-18, and 19. The figures represent examples of each specification outlined in the table below, but do not show every design application. All RNT quantities, radius size, distances from the apex of a radius, maximum attainable speeds, number of lanes and pavement surface size can be interchanged to apply to all potential roadway applications.

TABLE 6

| U.S. Public Roadway Speed limit (mph) | Deactivation RNT's |
|---|---|
| 5 | 1 |
| 10 | 1 |
| 15 | 1 |
| 20 | 1 |
| 25 | 1 |
| 30 | 1 |
| 35 | 2 |
| 40 | 2 |
| 45 | 2 |
| 50 | 2 |
| 55 | 2 |
| 60 | 3 |
| 65 | 3 |
| 70 | 3 |
| 75 | 4 |
| 80 | 4 |

TABLE 6-continued

| U.S. Public Roadway Speed limit (mph) | Deactivation RNT's |
|---|---|
| 85 | 4 |
| 90 | 4 |
| 93 | 5 |

Figure 26:
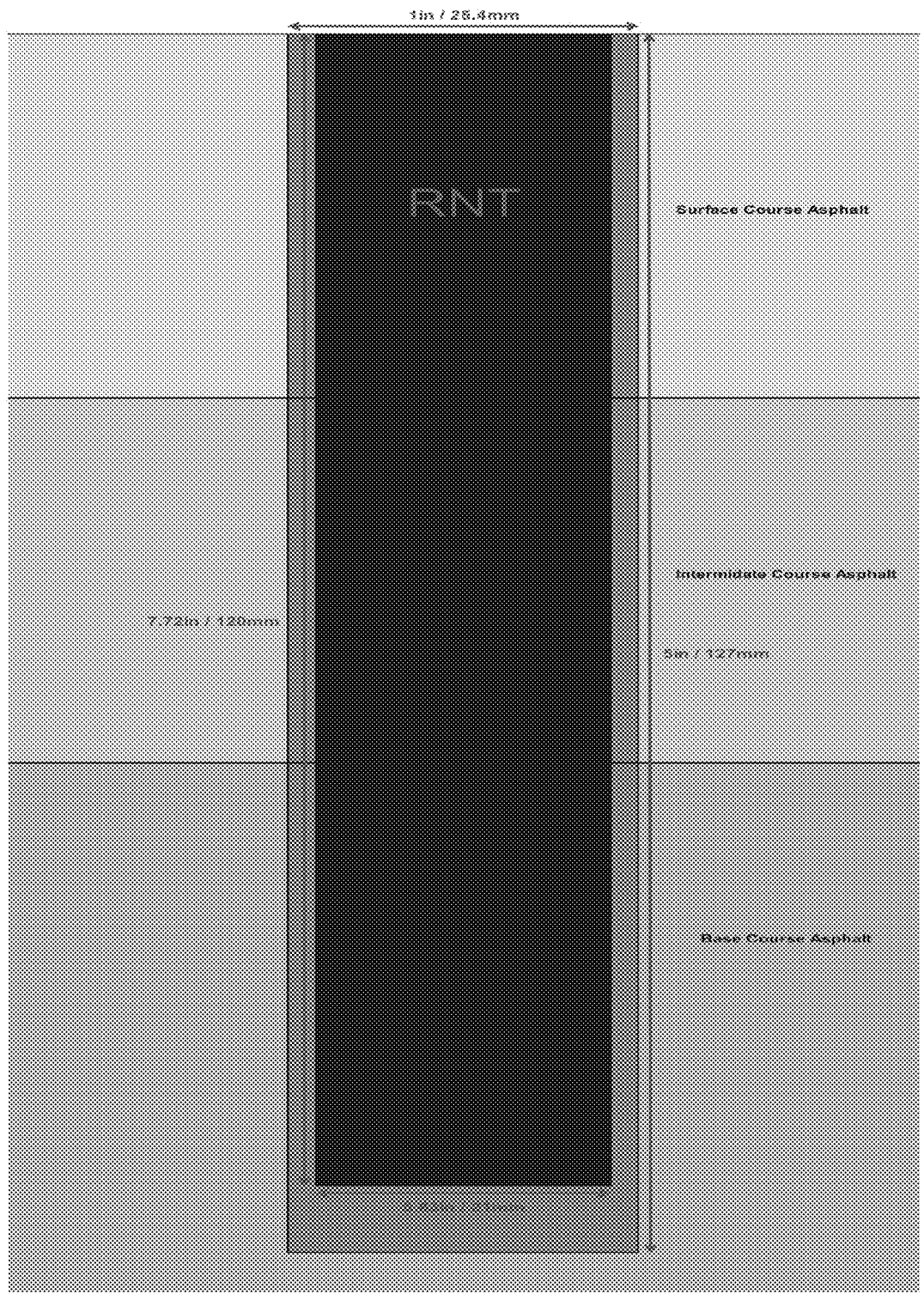
FIG. 26 provides a sectional view of an exemplary embodiment for installing the various RNTs within a roadway.

FIG. 26 provides a sectional view of an exemplary embodiment for installing the various RNTs within a roadway. Preferably, a hole is drilled that is slightly larger than the diameter of the RNT and filled with adhesive. Once inserted, preferably the RNT should sit flush or no more than 0.25 in below the pavement surface. The pavement cut should preferably be dry and free of dust, dirt, oil, grease or other impurities that could affect the bond of the adhesive with the RNT and the surrounding pavement. Adhesive that is not flush with the pavement surface should preferably be removed. RNTs should be placed when the pavement surface temperature and the ambient air temperature are at least 40° F. (5° C.) and the pavement is dry. It may be preferred to heat both parts of the RNT adhesive to 100±10° F. (38±5° C.) during installation when either the pavement surface or ambient air temperature is between 40 and 50° F. (5 and 10° C.).

Two component approved casting adhesive may be preferable to fill the pavement hole to within approximately 1.81 in of the top of the pavement. RNTs should be preferably flush or a maximum of 0.25 in below the pavement surface and the RNT adhesive should ooze out from under the RNT from all sides filling all voids around the RNT and be level with the pavement surface. An exemplary adhesive would be an epoxy resin adhesive. An exemplary method for installing and handling the adhesive is found in AASHTO M 237-96 (2009), which is available from the American Association of State Highway and Transportation Officials; 444 North Capitol Street N.W., Suite 249; Washington, D.C. 20001; the disclosure of this specification is herein incorporated by reference in its entirety.

In an exemplary embodiment, each automobile contains an RFID antenna which is typically placed on the undercarriage of an AMVG System controlled motor vehicle. The goal is to create the largest and most powerful magnetic field possible, thereby decreasing the amount of time required to fully charge the capacitor inside the RNTs. The shorter the charge time, the faster a motor vehicle can operate using the AMVG System.

The layout of RNTs and placement of SLIZs is typically dependent on the size of the RFID antenna and more specifically the magnetic field size created by the RFID antenna. The size of the magnetic field can be determined by several factors. It can be engineered to a specific size, calculated based off a set of parameters, provided by the manufacturer or measured. Also, the size of motor vehicles typically constraints the size of the RFID antenna because it will be attached to the bottom of the chassis in a position such that there are no metallic components between the RFID antenna and the surface of the roadway.

In the embodiment shown in FIG. 1 a motor vehicle 160 shows attached RFID antenna 50 with length L measured parallel to the flow of traffic and width W measured perpendicular to the flow of traffic. Generally speaking, and excluding motorcycles, the smallest motor vehicle currently manufactured for legal operation on U.S. public roadways has a length of 8 ft and width of 5 ft.

As an example, one design for an antenna would be as follows:
Magnetic Field Length: Preferably 7.5 ft
Magnetic Field Width: Preferably 4.5 ft
Magnetic Field Depth: Preferably based off the vehicle height above, the road and magnetic field depth required to encompass all LF RFID transponders in the foregoing LF RFID antenna magnetic field perimeter size.
Wire Type: Preferably 12AWG, Litz Wire; 24AWG 12 Strands
Loops of Wire: Preferably 3
Wire Spacing: Preferably 0.75 in
Encasement Material: Preferably Polymer. RFID antenna wire should preferably be covered by a minimum of 0.5 in and maximum of 1.5 in of polymer.

The RFID antenna should preferably be shielded by stainless steel, covering the encasement polymer to confine the size of the magnetic/signal transmission field created by the RFID antenna. This will prevent more than one RNT from being charged at a time and eliminate interference from other AMVG System controlled motor vehicles transmitting information.

An RFID reader is preferably used to initiate the magnetic field created by the RFID antenna and decode the radio signal transmitted from the RNTs. An exemplary RFID reader creates a magnetic field for a defined period of time. The RFID reader may then stop producing the magnetic field and wait to receive a radio signal from a charged transponder. This reader cycle is preferably repeated continually while the reader is powered and in operation. The time period during which the RFID antenna creates a magnetic field and awaits a response can be adjusted to allow for the best operation of RFID technology for the application at hand.

The required charge time for an RFID transponder is directly related to the amount of time needed for the reader to produce the magnetic field. The reader cycle time is decreased to the minimum magnetic field pulse/RFID transponder charge duration of 15 ms and the minimum radio signal observation/RFID transponder signal transmission duration of 20 ms. This cycle time of 35 ms maximizes the AMVG System's performance and is used in the simulation to validate the AMVG System's accuracy, thereby guaranteeing the speed limit of the roadway FIG. 27 provides an electrical schematic of one embodiment for the motor vehicle components including the MVTCS. The MVTCS is the component that connects the AMVG System with the motor vehicle. This device receives information from the RFID reader pertaining to the speed limit of the roadway. The RFID reader will preferably be programmed to store the signal from multiple RNTs and to recognize duplicate information from multiple RNTs as redundant information to ensure accurate information transmission. This information is then used by the device to monitor the motor vehicle's speed of travel, allowing the AMVG System to electronically override the operator, if necessary, and control the speed of travel. This link of communication between the RFID reader and the motor vehicle will vary depending on the manufacturer and possibly even the motor vehicle style. This device may be developed with each individual motor vehicle manufacturer to enable communication capabilities with the MVTCS and Operator Warning System.

Visual and Audio Operator Warning Systems may be used to inform the motor vehicle operator of the AMVG Systems Roadway Network's interaction with the motor vehicle. These warning systems also may vary depending on the manufacturer and style of motor vehicle. These audio and visual systems may consist of verbal and visual communication with the driver, identifying the speed limit of the roadway being traveled and its relation to current operation. This alone may help reduce a significant amount of speeding that occurs due to driver negligence with respect to posted speed limits of the roadway being traveled. The manner in which these warning systems operate can be determined by the vehicle manufacturer and can be built as intricate as a motor vehicle is luxurious.

Additionally, motor vehicles can be programmed with information before becoming a working part of the system, allowing RFID transponders to evolve and control more than just the speed of motor vehicles. For example, RNTs could be used as warning devices or means for other information transmission. Specifically, RNTs could be placed in roadways to identify Stop, Yield and Merge signs, as well as airports, restaurant, retail stores, gas station, parks and tourist attractions, among others.

Additionally, the high speed induction based charge transmission invented to power the RFID transponders (RNTs) can be used to power other electrical devices embedded in the roadway. For example, roadway temperature sensors, ice and snow melting devices and other infrastructure sensing devices, among others.

In the embodiment shown in FIG. 28, a number of Dynamic RNTs 120 may be placed in electrical communication with a computer network/internet connection 110 which may be in communication with a computer 100. As the motor vehicle 160 travels over the roadway 170, the RFID antenna 140 may receive electrical signals from the Dynamic RNTs 120. The electrical signals may be converted or otherwise interpreted by a processor 130 and communicated to the occupants of the automobile 160 through a communication system 150. In some embodiments the communication system 150 may be a flat panel display (LCD, OLED, etc.), audio communications, or both a flat panel display and audio communications.

This embodiment permits a user to update the information stored on the Dynamic RNTs 120 through the computer 100 and computer network/internet connection 110. This Information Communication Network System could allow the user to provide information like construction detours, traffic delays, Amber Alerts, breaking news, weather information and marketing information, among others.

Having shown and described preferred embodiments, those skilled in the art will realize that many variations and modifications may be made to affect the described embodiments and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

I claim:

1. A system for transmitting data to an object in a direction of travel, the object having an RFID antenna which produces a read range having a length (L) in the direction of travel and a width (W) substantially perpendicular to the direction of travel, the system comprising:
a first plurality of RFID transponders placed within a surface and positioned based on the length (L) of the read range, the width (W) of the read range, and the speed at which the object passes in a first row which is substantially perpendicular to the direction of travel, each transponder having data to be transferred to the object;
a second plurality of transponders placed within a surface based on the length (L) of the read range, the width (W) of the read range, and the speed at which the object passes and positioned in a second row which is substantially perpendicular to the direction of travel, each transponder having data to be transferred to the object;
where the second row is placed at distance (D) from the first row, where D is measured in a direction substantially parallel to the direction of travel.

2. The system of claim 1 wherein:
where the second row is offset from the first row.

3. The system of claim 1 wherein:
the spacing between a pair of adjacent transponders in the same row is greater than W.

4. The system of claim 1 wherein:
the data is received at the object at least twice when the object passes over one of the transponders while travelling less than approximately 30 miles per hour.

5. The system of claim 1 wherein:
D is greater than L.

6. The system of claim 1 wherein:
the second row is offset from the first row by distance (O), where O is measured in a direction that is perpendicular to the direction of travel, and O is between 40% and 60% of W.

7. The system of claim 1 further comprising:
a third plurality of transponders placed within a surface and positioned in a third row which is substantially perpendicular to the direction of travel, each transponder having data to be transferred to the object;
a fourth plurality of transponders placed within a surface and positioned in a fourth row which is substantially perpendicular to the direction of travel, each transponder having data to be transferred to the object;
where the third row follows the second row;
where the fourth row follows the third row;
where the third row is offset from the second row; and
where the fourth row is offset from the third row.

8. The system of claim 7 wherein:
the data is received at the object at least twice when the object passes over two of the transponders while travelling less than approximately 58 miles per hour.

9. The system of claim 1 wherein:
the data is a maximum speed limit for the surface.

10. The system of claim 1 wherein:
the transponders are active and placed in electrical communication with a network which is adapted to update the data stored on each transponder.

11. The system of claim 10 wherein:
the data stored on the active transponder is any one of the following: amber alerts, roadway conditions, and traffic information.

12. The system of claim 1 wherein:
the data is any one of the following: retail locations in the vicinity of the transponder, tourist attractions in the vicinity of the transponder, and restaurant locations in the vicinity of the transponder.

13. A system for transmitting data to an object travelling along a surface in a direction of travel, the object having an RFID antenna which produces a read range having a length (L) in the direction of travel and a width (W) substantially perpendicular to the direction of travel, the system comprising:
an activation zone within the surface comprising a plurality of RFID transponders placed within the surface based on the length (L) of the read range, the width (W)

of the read range, and the speed at which the object passes each transponder having control data to be transferred to the object;

a stretch of surface following the activation zone where the object operates based on the control data; and a deactivation zone following the stretch of surface and comprising a plurality of transponders placed within the surface based on the length (L) of the read range, the width (W) of the read range, and the speed at which the object passes, each transponder having release data to be transferred to the object, releasing control of the object.

14. The system of claim 13 further comprising:

a second deactivation zone preceding the activation zone and comprising a plurality of transponders placed within the surface, each transponder having release data to be transferred to the object.

15. The system of claim 14 wherein:

the deactivation zone is positioned adjacent to a first side of an intersection and the second deactivation is placed on a second side of the same intersection.

16. The system of claim 13 wherein:

the transponders are positioned in a series of rows where each row is substantially perpendicular to the direction of travel, each row being offset from the row immediately preceding it by a distance (O) which is measured in a direction substantially perpendicular to the direction of travel, and where each transponder within a row is separated by at least W.

17. A method for placing RFID transponders in a surface for data transmission to an object having a direction of travel, the method comprising the steps of:

(1) selecting a portion of the surface for placing the transponders;

(2) determining the maximum speed attainable by the object at the selected portion of the surface;

(3) determining the dimensions of read range emanating from the object, producing a length (L) in the direction travel and a width (W) in a direction substantially perpendicular to the direction of travel;

(4) determining the required spacing between transponders based on the results of steps (2) and (3); and (5) placing a first row of transponders across the roadway, oriented in a direction substantially perpendicular to the direction of travel, where each transponder within the row is spaced based on the results of step (4).

18. The method of claim 17 further comprising the steps of:

(6) determining how many rows of transponders the object must pass over to read the data, based on the results of steps (2), (3) and (4); and (7) placing the remaining number of rows of transponders based on the results of steps (4) and (6).

19. The method of claim 18 wherein:

step (5) is performed by placing the first row of transponders across the surface, oriented in a direction substantially perpendicular to the direction of travel, where each transponder within the row is spaced at least W from one another; and wherein step (7) is performed by placing the remaining rows of transponders across the surface, oriented in a direction substantially perpendicular to the direction of travel, where each transponder within the row is spaced at least W from one another, and where the second row is placed at least L from the first row, measured in the direction of vehicle travel, and where the second row is offset from the first row in a direction substantially perpendicular to the objects travel.

20. The method of claim 18 wherein:

step (6) is performed by determining how many transponders the object must pass over to read at least two redundant sets of data.

* * * * *